US011994959B2

(12) United States Patent
Parkinson et al.

(10) Patent No.: US 11,994,959 B2
(45) Date of Patent: *May 28, 2024

(54) SYSTEM AND METHOD FOR TRANSACTION RECOVERY IN A MULTITENANT APPLICATION SERVER ENVIRONMENT

(71) Applicant: Oracle International Corporation, Redwood Shores, CA (US)

(72) Inventors: Paul Parkinson, Orlando, FL (US); Hiromu Kato, San Francisco, CA (US); Arjav Desai, Mount Laurel, NJ (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 11 days.

This patent is subject to a terminal disclaimer.

(21) Appl. No.: 17/519,407

(22) Filed: Nov. 4, 2021

(65) Prior Publication Data

US 2022/0058095 A1 Feb. 24, 2022

Related U.S. Application Data

(63) Continuation of application No. 14/865,371, filed on Sep. 25, 2015, now Pat. No. 11,188,427.

(Continued)

(51) Int. Cl.
*G06F 16/00* (2019.01)
*G06F 9/46* (2006.01)
(Continued)

(52) U.S. Cl.
CPC .......... *G06F 11/1474* (2013.01); *G06F 9/466* (2013.01); *G06F 16/2365* (2019.01); *G06F 2201/87* (2013.01)

(58) Field of Classification Search
CPC ...... G06F 16/2365; G06F 16/18; G06F 16/23; G06F 16/27; G06F 16/128; G06F 16/258;
(Continued)

(56) References Cited

U.S. PATENT DOCUMENTS 5,835,766 A 11/1998 Iba et al.
5,848,282 A 12/1998 Kang
(Continued)

FOREIGN PATENT DOCUMENTS

CN 101639835 2/2010
CN 102170457 8/2011
(Continued)

OTHER PUBLICATIONS

The Korean Intellectual Property Office, Notice of Office Action dated Jan. 5, 2022 for Korean Patent Application No. 10-2017-7009554, 12 pages.

(Continued)

*Primary Examiner* — Albert M Phillips, III
*Assistant Examiner* — Rezwanul Mahmood
(74) *Attorney, Agent, or Firm* — TUCKER ELLIS LLP

(57) ABSTRACT

In accordance with an embodiment, described herein is a system and method for transaction recovery in a multitenant application server environment. At least one resource manager associated with a partition can be designated as a determiner resource for that partition only, in order to support eliminating transaction logs (TLOG) in processing a two-phase commit transaction. A transaction manager can prepare all other resource managers in the mid-tier transactional system before the determiner resource. Furthermore, the transaction manager can rely on the list of outstanding transactions to be committed that is provided by the determiner resource for recovering the transaction. The transaction manager can commit an in-doubt transaction returned (Continued)

from a resource manager that matches the list of in-doubt transactions returned from the determiner resource. Otherwise, the transaction manager can roll back the in-doubt transaction.

20 Claims, 13 Drawing Sheets

Related U.S. Application Data

(60) Provisional application No. 62/055,858, filed on Sep. 26, 2014.

(51) Int. Cl.
*G06F 11/14* (2006.01)
*G06F 16/23* (2019.01)

(58) Field of Classification Search
CPC .............. G06F 16/278; G06F 16/1815; G06F 16/1824; G06F 16/1834; G06F 16/1837; G06F 16/2471
USPC ......................................................... 707/679
See application file for complete search history.

(56) References Cited

U.S. PATENT DOCUMENTS

| | | | |
|---|---|---|---|
| 5,966,706 A | 10/1999 | Biliris et al. | |
| 5,983,225 A * | 11/1999 | Anfindsen | G06F 16/2343 710/200 |
| 6,041,357 A | 3/2000 | Kunzelman et al. | |
| 6,052,695 A * | 4/2000 | Abe | G06F 11/1471 |
| 6,182,186 B1 | 1/2001 | Daynes | |
| 6,260,068 B1 * | 7/2001 | Zalewski | G06F 9/5077 707/999.01 |
| 6,272,675 B1 * | 8/2001 | Schrab | G06F 9/466 717/100 |
| 6,275,843 B1 * | 8/2001 | Chorn | H04L 67/1001 718/101 |
| 6,442,552 B1 | 8/2002 | Frolund et al. | |
| 6,578,041 B1 * | 6/2003 | Lomet | G06F 11/1466 707/999.102 |
| 6,625,601 B1 * | 9/2003 | Molloy | G06F 9/52 |
| 6,728,747 B1 | 4/2004 | Jenkins et al. | |
| 6,850,938 B1 | 2/2005 | Sadjadi | |
| 6,922,792 B2 | 7/2005 | Moser et al. | |
| 7,082,432 B2 * | 7/2006 | Bhogi | G06F 9/466 |
| 7,228,455 B2 * | 6/2007 | Pavlik | H04L 69/40 714/18 |
| 7,289,964 B1 * | 10/2007 | Bowman-Amuah | G06F 9/5038 705/1.1 |
| 7,290,056 B1 * | 10/2007 | McLaughlin, Jr. | H04L 43/0852 709/201 |
| 7,415,470 B2 | 8/2008 | Kasamsetty et al. | |
| 7,478,099 B1 * | 1/2009 | Gandhi | G06F 16/23 707/999.102 |
| 7,502,824 B2 | 3/2009 | Kaluskar et al. | |
| 7,536,462 B2 | 5/2009 | Pandya | |
| 7,539,746 B2 * | 5/2009 | Bankier | G06Q 20/389 709/227 |
| 7,552,122 B1 | 6/2009 | Georgiev | |
| 7,552,218 B2 | 6/2009 | Kaluskar et al. | |
| 7,558,883 B1 | 7/2009 | Amport | |
| 7,631,107 B2 * | 12/2009 | Pandya | H04L 9/40 709/227 |
| 7,634,512 B2 | 12/2009 | Cao et al. | |
| 7,730,091 B2 * | 6/2010 | Buckler | G06F 16/285 707/610 |
| 7,747,754 B2 | 6/2010 | Kaluskar et al. | |
| 7,761,435 B2 | 7/2010 | Stanev et al. | |
| 7,797,306 B1 * | 9/2010 | Pather | H04L 12/1859 707/732 |
| 7,831,772 B2 * | 11/2010 | Nalawade | G06F 12/0871 711/119 |
| 7,844,851 B2 * | 11/2010 | Cosmadopoulos | H04L 69/40 714/4.1 |
| 7,849,173 B1 | 12/2010 | Uhlik | |
| 7,849,177 B2 | 12/2010 | Uhlik | |
| 7,853,698 B2 | 12/2010 | Stanev et al. | |
| 7,890,457 B2 | 2/2011 | Dias et al. | |
| 7,890,458 B2 | 2/2011 | Dias et al. | |
| 7,895,475 B2 * | 2/2011 | Kulkarni | G06F 11/3644 714/25 |
| 8,005,966 B2 | 8/2011 | Pandya | |
| 8,024,299 B2 | 9/2011 | Dias et al. | |
| 8,060,857 B2 * | 11/2011 | Biggerstaff | G06F 8/76 717/136 |
| 8,078,737 B2 * | 12/2011 | Cosmadopoulos | H04L 67/14 707/661 |
| 8,117,153 B2 * | 2/2012 | Cattell | G06F 16/24552 707/610 |
| 8,176,022 B1 | 5/2012 | Garcia | |
| 8,326,876 B1 | 12/2012 | Venkataraman | |
| 8,601,473 B1 * | 12/2013 | Aron | G06F 16/1748 718/1 |
| 8,713,295 B2 * | 4/2014 | Bax | G06F 9/4405 713/1 |
| 8,725,882 B2 | 5/2014 | Neel et al. | |
| 8,725,885 B1 | 5/2014 | Neel | |
| 8,743,872 B2 * | 6/2014 | Chidambaram | H04L 47/6215 370/386 |
| 8,776,050 B2 * | 7/2014 | Plouffe | G06F 9/45537 718/1 |
| 8,838,534 B2 * | 9/2014 | Fowler | G06F 16/27 707/684 |
| 8,892,509 B2 * | 11/2014 | Cattell | G06F 11/1666 707/610 |
| 8,914,406 B1 * | 12/2014 | Haugsnes | G06F 9/45558 710/316 |
| 8,924,346 B2 * | 12/2014 | Colrain | G06F 9/466 707/615 |
| 8,984,170 B2 * | 3/2015 | Colrain | H04L 67/148 707/703 |
| 9,009,116 B2 * | 4/2015 | Cattell | G06F 16/217 707/656 |
| 9,323,922 B2 | 4/2016 | Muralidharan et al. | |
| 9,389,922 B2 * | 7/2016 | Bauer | H04L 41/5009 |
| 9,405,530 B2 * | 8/2016 | Islam | G06F 11/1438 |
| 9,432,350 B2 * | 8/2016 | Anderson | G06F 9/455 |
| 9,524,186 B2 * | 12/2016 | Shen | H04L 67/10 |
| 9,578,009 B2 * | 2/2017 | Hopkins | H04L 63/08 |
| 9,600,500 B1 * | 3/2017 | Gupta | G06F 16/27 |
| 9,667,430 B2 * | 5/2017 | Connelly | G06Q 40/12 |
| 9,697,052 B2 * | 7/2017 | Dipol | H04L 47/783 |
| 9,747,137 B2 * | 8/2017 | Quinn | G06F 9/5077 |
| 9,774,401 B1 * | 9/2017 | Borrill | H04L 9/0852 |
| 9,792,099 B2 * | 10/2017 | Zhang | G06F 8/65 |
| 9,799,017 B1 * | 10/2017 | Vermeulen | G06F 16/285 |
| 9,807,119 B2 * | 10/2017 | Watson | H04L 63/20 |
| 9,811,386 B2 * | 11/2017 | Nanjundaswamy | G06F 9/5077 |
| 9,819,609 B2 * | 11/2017 | Nanjundaswamy | H04L 67/01 |
| 9,843,629 B2 * | 12/2017 | Abdelaziz | G06F 9/54 |
| 9,906,601 B2 * | 2/2018 | Zhang | G06F 9/5077 |
| 9,930,129 B2 * | 3/2018 | Felts | H04L 67/1097 |
| 9,959,421 B2 * | 5/2018 | Inamdar | H04L 43/0817 |
| 9,961,011 B2 * | 5/2018 | Mordani | H04L 47/78 |
| 9,967,324 B2 * | 5/2018 | Somogyi | G06F 9/5077 |
| 9,971,671 B2 * | 5/2018 | Inamdar | G06F 11/3648 |
| 9,977,681 B2 * | 5/2018 | Patel | G06F 9/5077 |
| 10,007,691 B2 * | 6/2018 | Gleeson | G06F 16/2379 |
| 10,009,225 B2 * | 6/2018 | Mares | G06Q 10/101 |
| 10,009,425 B2 * | 6/2018 | Shavell | H04L 67/63 |
| 10,015,242 B2 * | 7/2018 | Konkus | H04L 67/1025 |
| 10,027,550 B2 * | 7/2018 | Lam | H04L 41/0893 |
| 10,027,595 B2 * | 7/2018 | Lai | H04L 47/70 |
| 10,038,645 B2 * | 7/2018 | Patel | H04L 47/78 |
| 10,050,903 B2 * | 8/2018 | Sahoo | H04L 67/566 |
| 10,051,043 B2 * | 8/2018 | Kasso | H04L 67/10 |

(56) References Cited

U.S. PATENT DOCUMENTS

| | | | |
|---|---|---|---|
| 10,084,723 B2* | 9/2018 | Mordani | H04L 47/827 |
| 10,084,843 B2* | 9/2018 | Liu | H04L 67/10 |
| 10,091,135 B2* | 10/2018 | Sahoo | H04L 67/567 |
| 10,097,589 B2* | 10/2018 | Hopkins | H04L 67/02 |
| 10,103,946 B2* | 10/2018 | Xiao | H04L 41/12 |
| 10,104,011 B2* | 10/2018 | Sahoo | H04L 47/762 |
| 10,114,678 B2* | 10/2018 | Sabin | G06F 9/5072 |
| 10,178,184 B2* | 1/2019 | Dorr | H04L 67/147 |
| 10,187,454 B2* | 1/2019 | Sengodan | H04L 67/1008 |
| 10,193,754 B2* | 1/2019 | Lu | G06F 9/5077 |
| 10,225,209 B2* | 3/2019 | Inamdar | H04L 67/1097 |
| 10,250,512 B2* | 4/2019 | Sidde | H04L 67/1001 |
| 10,284,486 B2* | 5/2019 | Thyagarajan | G06F 9/5077 |
| 10,310,841 B2* | 6/2019 | Mutreja | G06F 8/656 |
| 10,318,280 B2* | 6/2019 | Islam | G06F 8/658 |
| 10,339,127 B2* | 7/2019 | Colrain | G06F 11/0757 |
| 10,348,565 B2* | 7/2019 | Kannan | G06F 9/5077 |
| 10,348,822 B2* | 7/2019 | Phan | H04L 41/12 |
| 10,356,161 B2* | 7/2019 | Bajaj | G06F 9/44521 |
| 10,382,537 B2* | 8/2019 | Mordani | H04L 67/1044 |
| 10,439,953 B2* | 10/2019 | Patel | H04L 45/04 |
| 10,452,387 B2* | 10/2019 | Lindholm | G06F 8/656 |
| 10,462,068 B2* | 10/2019 | Mordani | G06F 16/273 |
| 10,467,061 B2* | 11/2019 | Quinn | G06F 9/5077 |
| 10,469,401 B2* | 11/2019 | Mordani | H04L 67/564 |
| 10,474,998 B2* | 11/2019 | Xiao | G06Q 10/107 |
| 10,476,938 B2* | 11/2019 | Barnes | H04L 41/5041 |
| 10,523,709 B2* | 12/2019 | Bower | G06F 9/44505 |
| 10,594,619 B2* | 3/2020 | Kasso | H04L 67/1008 |
| 10,635,491 B2* | 4/2020 | Islam | G06F 9/50 |
| 10,715,472 B2* | 7/2020 | Gambino | H04L 51/18 |
| 10,742,568 B2* | 8/2020 | Mordani | H04L 67/10 |
| 10,805,350 B2* | 10/2020 | Koul | H04L 63/20 |
| 10,868,721 B2* | 12/2020 | Schneider | H04L 41/0895 |
| 10,873,627 B2* | 12/2020 | Gleyzer | H04L 45/566 |
| 11,057,272 B2* | 7/2021 | Parkinson | H04L 41/0843 |
| 11,070,559 B2* | 7/2021 | Xiao | H04L 51/216 |
| 11,075,799 B2* | 7/2021 | Nelson | G06F 9/5077 |
| 11,138,017 B2* | 10/2021 | Dipol | G06F 9/485 |
| 11,188,427 B2* | 11/2021 | Parkinson | G06F 9/466 |
| 11,237,814 B2* | 2/2022 | Lindholm | H04L 67/34 |
| 11,477,278 B2* | 10/2022 | Mordani | H04L 67/01 |
| 11,544,149 B2* | 1/2023 | Srinivasan | G06F 11/3006 |
| 2002/0083078 A1* | 6/2002 | Pardon | G06F 9/466 |
| 2002/0087366 A1* | 7/2002 | Collier | G06Q 10/02 705/5 |
| 2002/0188538 A1* | 12/2002 | Robertson | H04L 67/54 705/35 |
| 2003/0028654 A1 | 2/2003 | Abjanic et al. | |
| 2003/0046342 A1* | 3/2003 | Felt | H04L 67/1038 714/15 |
| 2003/0084056 A1* | 5/2003 | DeAnna | G06F 9/465 |
| 2003/0105768 A1* | 6/2003 | Berkowitz | G06F 16/273 |
| 2003/0131045 A1 | 7/2003 | McGee et al. | |
| 2003/0204769 A1 | 10/2003 | Coughlin | |
| 2004/0015600 A1* | 1/2004 | Tiwary | G06F 11/3414 714/E11.193 |
| 2004/0068501 A1* | 4/2004 | McGoveran | G06F 11/1474 714/E11.131 |
| 2004/0215772 A1 | 10/2004 | Dinker et al. | |
| 2004/0216109 A1* | 10/2004 | Bhogi | G06F 9/466 718/101 |
| 2004/0220933 A1* | 11/2004 | Walker | G06F 9/466 |
| 2004/0225915 A1* | 11/2004 | Johnson | G06F 11/2007 714/13 |
| 2004/0255298 A1* | 12/2004 | Dorrance | G06F 16/2365 707/E17.007 |
| 2005/0015353 A1* | 1/2005 | Kumar | G06F 9/466 |
| 2005/0021514 A1 | 1/2005 | Barga et al. | |
| 2005/0038848 A1 | 2/2005 | Kaluskar et al. | |
| 2005/0125445 A1* | 6/2005 | Cotner | G06F 16/2365 |
| 2005/0131879 A1 | 6/2005 | Ghosh et al. | |
| 2005/0186975 A1 | 8/2005 | Yach et al. | |
| 2005/0187891 A1* | 8/2005 | Johnson | G06F 11/202 |
| 2005/0216421 A1* | 9/2005 | Barry | H04M 15/00 705/64 |
| 2005/0228834 A1 | 10/2005 | Shinkai | |
| 2005/0262077 A1* | 11/2005 | Barnes | G06F 16/2358 |
| 2006/0036463 A1 | 2/2006 | Patrick et al. | |
| 2006/0036617 A1 | 2/2006 | Bastawala et al. | |
| 2006/0075277 A1* | 4/2006 | Johnson | G06F 11/1474 714/E11.131 |
| 2006/0111880 A1* | 5/2006 | Brown | G06F 8/20 703/1 |
| 2006/0174224 A1* | 8/2006 | Parkinson | G06F 9/466 717/120 |
| 2006/0179125 A1* | 8/2006 | Pavlik | G06F 9/465 709/219 |
| 2006/0190243 A1* | 8/2006 | Barkai | G06F 16/24554 704/8 |
| 2006/0190504 A1* | 8/2006 | Pruet, III | G06F 16/2343 |
| 2006/0282422 A1 | 12/2006 | Al-Omari | |
| 2007/0028208 A1* | 2/2007 | Maki | G06F 8/36 717/106 |
| 2007/0028244 A1* | 2/2007 | Landis | G06F 9/4555 718/108 |
| 2007/0043784 A1* | 2/2007 | Parkinson | G06F 16/21 |
| 2007/0061441 A1* | 3/2007 | Landis | G06F 9/4555 709/224 |
| 2007/0067266 A1* | 3/2007 | Lomet | G06F 16/951 |
| 2007/0067366 A1* | 3/2007 | Landis | G06F 12/109 |
| 2007/0143261 A1* | 6/2007 | Uppala | G06F 16/245 |
| 2007/0143339 A1* | 6/2007 | Springett | G06F 16/252 |
| 2007/0168351 A1 | 7/2007 | Fachan | |
| 2007/0198681 A1* | 8/2007 | Bakke | H04L 65/1104 709/223 |
| 2007/0226218 A1* | 9/2007 | Chatterjee | G06F 16/2343 |
| 2007/0261054 A1* | 11/2007 | Chesebro | G06F 9/466 718/100 |
| 2008/0010240 A1 | 1/2008 | Zait | |
| 2008/0010287 A1* | 1/2008 | Hinton | H04L 61/30 |
| 2008/0010288 A1* | 1/2008 | Hinton | H04L 63/0815 |
| 2008/0097960 A1 | 4/2008 | Dias et al. | |
| 2008/0097961 A1 | 4/2008 | Dias et al. | |
| 2008/0097995 A1 | 4/2008 | Dias et al. | |
| 2008/0097996 A1 | 4/2008 | Dias et al. | |
| 2008/0098003 A1 | 4/2008 | Dias et al. | |
| 2008/0098048 A1 | 4/2008 | Cao et al. | |
| 2008/0134219 A1* | 6/2008 | Dorrance | G06F 9/466 707/E17.007 |
| 2008/0189679 A1* | 8/2008 | Rodriguez | G06F 8/34 717/105 |
| 2008/0196029 A1* | 8/2008 | Doty | G06F 9/466 718/101 |
| 2008/0228834 A1 | 9/2008 | Burchall et al. | |
| 2008/0235295 A1* | 9/2008 | Parkinson | G06F 11/1474 |
| 2008/0250074 A1* | 10/2008 | Parkinson | G06F 16/2358 |
| 2009/0007097 A1* | 1/2009 | Hinton | G06F 8/61 717/176 |
| 2009/0037452 A1* | 2/2009 | Baitalmal | G06F 16/27 |
| 2009/0037492 A1* | 2/2009 | Baitalmal | G06F 16/27 |
| 2009/0077135 A1* | 3/2009 | Yalamanchi | G06F 16/2336 |
| 2009/0094252 A1* | 4/2009 | Wong | H04L 67/1095 |
| 2009/0113110 A1 | 4/2009 | Chen | |
| 2009/0118839 A1* | 5/2009 | Accapadi | G06F 21/80 700/28 |
| 2009/0182787 A1* | 7/2009 | Parkinson | G06F 16/00 |
| 2009/0222823 A1* | 9/2009 | Parkinson | G06F 9/466 718/101 |
| 2009/0300023 A1* | 12/2009 | Vaghani | G06F 3/0643 711/170 |
| 2009/0327468 A1 | 12/2009 | Hirsch et al. | |
| 2010/0005097 A1 | 1/2010 | Liang et al. | |
| 2010/0030818 A1 | 2/2010 | Cooper et al. | |
| 2010/0042601 A1 | 2/2010 | Kelley et al. | |
| 2010/0063982 A1 | 3/2010 | Lawrence | |
| 2010/0080241 A1* | 4/2010 | Cosmadopoulos | H04L 12/403 370/449 |
| 2010/0106842 A1* | 4/2010 | Cosmadopoulos | H04L 67/5682 709/228 |

(56) References Cited

U.S. PATENT DOCUMENTS

| | | | |
|---|---|---|---|
| 2010/0169289 A1* | 7/2010 | Newport | G06F 16/2365 707/705 |
| 2010/0293137 A1 | 11/2010 | Zuckerman et al. | |
| 2010/0318394 A1 | 12/2010 | Nayak et al. | |
| 2011/0035356 A1* | 2/2011 | Vukojevic | G06F 16/1865 711/E12.001 |
| 2011/0041006 A1* | 2/2011 | Fowler | G06F 9/466 714/E11.131 |
| 2011/0093435 A1* | 4/2011 | Zha | G06F 16/128 711/E12.001 |
| 2011/0093469 A1* | 4/2011 | B'Far | G06F 16/254 707/754 |
| 2011/0145204 A1* | 6/2011 | Maple | G06F 11/2046 707/682 |
| 2011/0212783 A1 | 9/2011 | Dale et al. | |
| 2011/0213870 A1 | 9/2011 | Cai | |
| 2011/0218981 A1 | 9/2011 | Retnakumari et al. | |
| 2011/0238630 A1* | 9/2011 | Nishigaki | G06F 16/2358 707/E17.007 |
| 2011/0258630 A1 | 10/2011 | Fee et al. | |
| 2011/0276550 A1 | 11/2011 | Colle et al. | |
| 2011/0276579 A1* | 11/2011 | Colrain | G06F 16/86 707/756 |
| 2011/0307450 A1* | 12/2011 | Hahn | G06F 16/2282 707/769 |
| 2012/0047126 A1* | 2/2012 | Branscome | G06F 16/24569 707/713 |
| 2012/0072597 A1 | 3/2012 | Teather | |
| 2012/0110566 A1 | 5/2012 | Park | |
| 2012/0173581 A1* | 7/2012 | Hartig | G06F 11/0745 707/E17.001 |
| 2012/0173589 A1* | 7/2012 | Kwon | G06F 16/248 707/E17.005 |
| 2012/0179645 A1 | 7/2012 | Lomet et al. | |
| 2012/0296883 A1* | 11/2012 | Ganesh | G06F 16/185 707/693 |
| 2013/0024863 A1* | 1/2013 | Parkinson | G06F 9/466 718/101 |
| 2013/0055243 A1* | 2/2013 | Dandekar | G06F 9/45558 718/1 |
| 2013/0066837 A1* | 3/2013 | Colrain | G06F 16/2365 707/674 |
| 2013/0066948 A1* | 3/2013 | Colrain | H04L 67/142 709/203 |
| 2013/0066949 A1* | 3/2013 | Colrain | G06F 9/466 709/203 |
| 2013/0066952 A1* | 3/2013 | Colrain | G06F 11/1438 709/203 |
| 2013/0066955 A1 | 3/2013 | Neel et al. | |
| 2013/0085996 A1* | 4/2013 | Tian | G06F 16/27 707/648 |
| 2013/0103654 A1* | 4/2013 | McLachlan | G06F 16/245 707/692 |
| 2013/0132458 A1* | 5/2013 | Little | G06F 16/1865 709/201 |
| 2013/0246368 A1* | 9/2013 | Parkinson | G06F 16/21 707/674 |
| 2013/0246379 A1* | 9/2013 | Shen | G06F 9/466 707/703 |
| 2013/0246554 A1 | 9/2013 | Lv | |
| 2013/0246845 A1* | 9/2013 | Parkinson | G06F 11/0709 714/16 |
| 2013/0290524 A1* | 10/2013 | Liu | G06F 9/546 709/224 |
| 2013/0297566 A1 | 11/2013 | Colrain et al. | |
| 2013/0304714 A1* | 11/2013 | Lee | G06F 16/2365 707/703 |
| 2013/0346380 A1* | 12/2013 | Dong | G06F 16/23 707/705 |
| 2014/0075565 A1* | 3/2014 | Srinivasan | H04L 63/10 726/26 |
| 2014/0095547 A1 | 4/2014 | Guo et al. | |
| 2014/0149483 A1* | 5/2014 | Mitchell | G06F 9/466 709/201 |
| 2014/0157276 A1* | 6/2014 | Smithson | G06F 9/466 718/101 |
| 2014/0229531 A1 | 8/2014 | Neel et al. | |
| 2014/0250436 A1* | 9/2014 | Tang | G06F 9/466 718/1 |
| 2014/0279899 A1* | 9/2014 | Gu | G06F 16/27 707/634 |
| 2014/0330767 A1* | 11/2014 | Fowler | G06F 16/288 707/607 |
| 2014/0344782 A1* | 11/2014 | Hill | G06F 9/5072 717/121 |
| 2014/0358972 A1* | 12/2014 | Guarrieri | G06F 16/21 707/781 |
| 2015/0089068 A1* | 3/2015 | Islam | G06F 9/50 709/226 |
| 2015/0089274 A1* | 3/2015 | Mares | H04L 41/5045 714/4.11 |
| 2015/0120531 A1 | 4/2015 | Stridh | |
| 2015/0172390 A1 | 6/2015 | Colrain et al. | |
| 2015/0207758 A1* | 7/2015 | Mordani | H04L 47/78 709/226 |
| 2015/0212850 A1* | 7/2015 | Little | G06F 16/2365 707/703 |
| 2015/0234682 A1* | 8/2015 | Dageville | G06F 16/2456 718/104 |
| 2015/0277974 A1* | 10/2015 | Beale | G06F 9/5088 714/19 |
| 2015/0281336 A1* | 10/2015 | Beale | G06F 15/17331 709/201 |
| 2015/0309884 A1 | 10/2015 | Campbell et al. | |
| 2015/0309889 A1* | 10/2015 | Campbell | G06F 9/466 714/16 |
| 2015/0319265 A1* | 11/2015 | DeRoo | G06F 9/466 709/217 |
| 2015/0326673 A1 | 11/2015 | Neel et al. | |
| 2015/0370549 A1* | 12/2015 | Zhang | G06F 8/65 717/172 |
| 2015/0372883 A1* | 12/2015 | Lam | H04L 41/0893 709/226 |
| 2015/0372887 A1* | 12/2015 | Inamdar | G06F 21/6218 709/224 |
| 2015/0372936 A1* | 12/2015 | Kasso | H04L 67/1031 709/226 |
| 2015/0372937 A1* | 12/2015 | Lai | H04L 47/70 709/226 |
| 2015/0372938 A1* | 12/2015 | Patel | H04L 45/04 709/226 |
| 2015/0372941 A1* | 12/2015 | Patel | H04L 67/10 709/226 |
| 2015/0373004 A1* | 12/2015 | Hopkins | G06F 16/278 726/6 |
| 2015/0373097 A1* | 12/2015 | Konkus | H04L 67/1025 709/203 |
| 2015/0373098 A1* | 12/2015 | Mordani | H04L 67/1025 709/203 |
| 2015/0373099 A1* | 12/2015 | Dipol | G06F 9/5077 709/203 |
| 2015/0373117 A1* | 12/2015 | Gleyzer | H04L 47/829 709/215 |
| 2016/0013983 A1* | 1/2016 | Lu | G06F 9/5077 709/226 |
| 2016/0014038 A1* | 1/2016 | Thyagarajan | H04L 47/70 709/226 |
| 2016/0014191 A1* | 1/2016 | Liu | H04L 41/08 709/202 |
| 2016/0014212 A1* | 1/2016 | Zhang | H04L 67/10 709/226 |
| 2016/0020949 A1* | 1/2016 | Mares | H04L 41/0813 709/221 |
| 2016/0070589 A1* | 3/2016 | Vermeulen | G06F 9/466 711/153 |
| 2016/0085543 A1* | 3/2016 | Islam | G06F 9/5077 717/171 |

(56) References Cited

U.S. PATENT DOCUMENTS

| | | | |
|---|---|---|---|
| 2016/0085772 A1* | 3/2016 | Vermeulen | G06F 16/21 707/615 |
| 2016/0086260 A1* | 3/2016 | Vermeulen | G06Q 40/00 705/35 |
| 2016/0088108 A1* | 3/2016 | Felts | H04L 67/1097 709/223 |
| 2016/0092197 A1 | 3/2016 | Kuchibhotla et al. | |
| 2016/0092319 A1* | 3/2016 | Parkinson | G06F 9/466 707/679 |
| 2016/0092342 A1* | 3/2016 | Inamdar | G06F 11/3648 717/124 |
| 2016/0094403 A1* | 3/2016 | Somogyi | G06F 9/5077 709/224 |
| 2016/0094404 A1* | 3/2016 | Kasso | H04L 41/5041 709/223 |
| 2016/0094405 A1* | 3/2016 | Barnes | H04L 41/5041 709/204 |
| 2016/0094406 A1* | 3/2016 | Phan | H04L 41/0893 709/223 |
| 2016/0094407 A1* | 3/2016 | Parkinson | H04L 41/0897 709/223 |
| 2016/0094408 A1* | 3/2016 | Segu | H04L 41/0843 709/223 |
| 2016/0094473 A1* | 3/2016 | Mordani | H04L 67/02 709/226 |
| 2016/0094474 A1* | 3/2016 | Sahoo | H04L 47/762 709/226 |
| 2016/0094478 A1* | 3/2016 | Quinn | G06F 9/5077 709/226 |
| 2016/0094484 A1* | 3/2016 | Mordani | G06F 8/656 709/226 |
| 2016/0094486 A1* | 3/2016 | Sahoo | G06F 9/455 709/226 |
| 2016/0094498 A1* | 3/2016 | Xiao | G06F 9/5061 709/206 |
| 2016/0094510 A1* | 3/2016 | Xiao | G06Q 10/107 709/206 |
| 2016/0094582 A1* | 3/2016 | Watson | H04L 41/0273 726/1 |
| 2016/0094583 A1* | 3/2016 | Bower | G06F 21/53 726/1 |
| 2016/0094624 A1* | 3/2016 | Mordani | H04L 67/02 709/203 |
| 2016/0094625 A1* | 3/2016 | Sengodan | H04L 51/23 709/204 |
| 2016/0094626 A1* | 3/2016 | Bajaj | G06F 9/44521 709/203 |
| 2016/0094627 A1* | 3/2016 | Subramanyam | G06F 9/54 709/203 |
| 2016/0094635 A1* | 3/2016 | Kannan | H04L 41/0893 709/203 |
| 2016/0094647 A1* | 3/2016 | Mordani | H04L 47/70 709/226 |
| 2016/0099948 A1 | 4/2016 | Ott | |
| 2016/0124993 A1 | 5/2016 | Watson et al. | |
| 2016/0142506 A1* | 5/2016 | Sahoo | H04L 67/566 709/226 |
| 2016/0210322 A1* | 7/2016 | Little | G06F 9/466 |
| 2016/0231998 A1* | 8/2016 | Islam | G06F 11/1438 |
| 2016/0314162 A1* | 10/2016 | Tarta | G06F 16/273 |
| 2016/0321304 A9 | 11/2016 | Colrain et al. | |
| 2016/0328268 A1* | 11/2016 | Islam | G06F 9/5077 |
| 2016/0350102 A1 | 12/2016 | Karpuram et al. | |
| 2016/0371356 A1* | 12/2016 | Lee | G06F 16/273 |
| 2017/0017494 A1* | 1/2017 | Patel | G06F 9/4401 |
| 2017/0019467 A1* | 1/2017 | Inamdar | H04L 67/1097 |
| 2017/0019485 A1* | 1/2017 | Dorr | H04L 67/147 |
| 2017/0034071 A1* | 2/2017 | Sidde | H04L 67/1025 |
| 2017/0091231 A1* | 3/2017 | DiFranco | G06F 16/93 |
| 2017/0116041 A1* | 4/2017 | Nanjundaswamy | G06F 16/188 |
| 2017/0118137 A1* | 4/2017 | Nanjundaswamy | H04L 67/1097 |
| 2017/0126742 A1* | 5/2017 | Hopkins | H04L 47/70 |
| 2017/0177617 A1 | 6/2017 | Johnson et al. | |
| 2017/0177697 A1* | 6/2017 | Lee | G06F 1/14 |
| 2017/0177698 A1* | 6/2017 | Lee | G06F 16/2315 |
| 2017/0192772 A1* | 7/2017 | Islam | G06F 9/5077 |
| 2017/0220621 A1* | 8/2017 | Colrain | G06F 11/0745 |
| 2017/0221140 A1* | 8/2017 | Melamed | G06Q 30/0645 |
| 2018/0041382 A1* | 2/2018 | Bhat | H04L 69/40 |
| 2018/0081673 A1* | 3/2018 | Mutreja | G06F 8/656 |
| 2018/0081676 A1* | 3/2018 | Lindholm | G06F 8/656 |
| 2018/0081694 A1* | 3/2018 | Dipol | G06F 9/485 |
| 2018/0227242 A1* | 8/2018 | Mordani | H04L 67/10 |
| 2019/0056926 A1* | 2/2019 | Lindholm | G06F 8/65 |
| 2019/0058632 A1* | 2/2019 | Schneider | H04L 43/10 |
| 2019/0068440 A1* | 2/2019 | Nelson | G06F 9/48 |
| 2019/0068536 A1* | 2/2019 | Gambino | H04L 67/10 |
| 2019/0068606 A1* | 2/2019 | Xiao | H04L 65/1063 |
| 2019/0253457 A1* | 8/2019 | Koul | H04L 63/20 |
| 2020/0213115 A1* | 7/2020 | Mathane | G06F 21/575 |
| 2021/0208971 A1* | 7/2021 | Srinivasan | G06F 9/5077 |
| 2022/0058095 A1* | 2/2022 | Parkinson | G06F 16/2365 |
| 2023/0023262 A1* | 1/2023 | Islam | G06F 9/5077 |

FOREIGN PATENT DOCUMENTS

| | | |
|---|---|---|
| CN | 102333115 | 1/2012 |
| CN | 102571821 | 7/2012 |
| CN | 102571916 | 7/2012 |
| CN | 102609271 | 7/2012 |
| CN | 102932404 | 2/2013 |
| CN | 102932405 | 2/2013 |
| CN | 103455512 | 12/2013 |
| WO | 2013138774 | 9/2013 |

OTHER PUBLICATIONS

Colle, et al., "Oracle Database Replay", VLDB '09, Aug. 24-28, 2009, ACM, 4 pages.

Galanis, et al., "Oracle Database Replay", SIGMOD '08, Jun. 9-12, 2008, ACM, 12 pages.

Oracle, "Database Replay", An Oracle White Paper, Nov. 2007, 19 pages.

Oracle, "Oracle Database JDBC Developer's Guide", 11g Release 2 (11.2), Part No. E16548-02, published 2010, retrieved from https://docs.oracle.com/cd/E18283_01/java.112/e16548/ocitaf.htm#BABGIDEE on Jun. 29, 2021, 3 pages.

Samaras, et al., "Two-Phase Commit Optimizations in a Commercial Distributed Environment", Distributed and Parallel Databases, pp. 325-360, 1995, 36 pages.

Kuhn, Darl; "Pro Oracle Database 12c Administration; Chapter 23: Pluggable Databases", Jul. 3, 2013, pp. 667-697, 30 pages.

Jia, Changyun et al., "Research on Multi-tenant PaaS Cloud Security on Java Platform", 2013 International Conference on Information Science and Cloud Computing Companion, © 2014 IEEE, pp. 260-266.

Anonymous, Wikipedia, "Application server", Dec. 6, 2013, 4 pages, retrieved from: <https://en.wikipedia.org/wiki/Application_server>.

Oracle, Oracle® Database JDBC Developer's Guide and Reference 10g Release 2 (10.2) B14355-04, Mar. 2010, Copyright © 1999, 2010, 486 pages.

European Patent Office, Summons to attend oral proceedings pursuant to Rule 115(1) EPC dated Dec. 8, 2021 for European Patent Application No. 15704133.6 , 8 pages.

European Patent Office, Communication pursuant to Article 94(3) EPC dated Nov. 18, 2021 for European Patent Application No. 15779102.1 , 4 pages.

United States Patent and Trademark Office, Notice of Allowance and Fee(s) Due dated Jan. 26, 2022 for U.S. Appl. No. 16/918,631 , 19 pages.

(56) References Cited

OTHER PUBLICATIONS

United States Patent and Trademark Office, Notice of Allowance and Fee(s) Due dated Feb. 2, 2023 for U.S. Appl. No. 17/732,297, 18 pages.

* cited by examiner

SYSTEM AND METHOD FOR TRANSACTION RECOVERY IN A MULTITENANT APPLICATION SERVER ENVIRONMENT

CLAIM OF PRIORITY AND CROSS-REFERENCE TO RELATED APPLICATIONS

This application is a continuation of and claims the benefit of priority to U.S. Patent Application entitled "SYSTEM AND METHOD FOR TRANSACTION RECOVERY IN A MULTITENANT APPLICATION SERVER ENVIRONMENT", application Ser. No. 14/865,371, filed on Sep. 25, 2015, which application claims the benefit of priority to U.S. Provisional Application titled "SYSTEM AND METHOD FOR TRANSACTION RECOVERY IN A MULTITENANT APPLICATION SERVER ENVIRONMENT", Application No. 62/055,858, filed Sep. 26, 2014; and is related to U.S. Patent Application titled "SYSTEM AND METHOD FOR SUPPORTING MULTI-TENANCY IN AN APPLICATION SERVER, CLOUD, OR OTHER ENVIRONMENT", application Ser. No. 14/601,883, filed Jan. 21, 2015; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to a system and method for transaction recovery in a multitenant application server environment.

BACKGROUND

Application servers generally provide a managed environment within which software applications can be deployed and run. Cloud-based environments allow applications to run within and take advantage of the distributed resources provided by a cloud. Such environments can support large numbers of users or tenants, some of which may have specific requirements that are particular to that user or tenant.

SUMMARY

In accordance with an embodiment, described herein is a system and method for transaction recovery in a multitenant application server environment. At least one resource manager associated with a partition can be designated as a determiner resource manager for that partition, in order to support eliminating transaction logs (TLOG) in processing a two-phase commit transaction. A transaction manager can prepare all other resource managers in the mid-tier transactional system before the determiner resource manager. Furthermore, the transaction manager can rely on the list of outstanding transactions to be committed that is provided by the determiner resource for recovering the transaction. The transaction manager can commit an in-doubt transaction returned from a resource manager that matches the list of in-doubt transactions returned from the determiner resource manager. Otherwise, the transaction manager can roll back the in-doubt transaction.

DETAILED DESCRIPTION

In accordance with an embodiment, described herein is a system and method for transaction recovery in a multitenant application server environment. At least one resource manager associated with a partition can be designated as a determiner resource manager for that partition only, in order to support eliminating transaction logs (TLOG) in processing a two-phase commit transaction. A transaction manager can prepare all other resource managers in the mid-tier transactional system before the determiner resource. Furthermore, the transaction manager can rely on the list of outstanding transactions to be committed that is provided by the determiner resource for recovering the transaction. The transaction manager can commit an in-doubt transaction returned from a resource manager that matches the list of in-doubt transactions returned from the determiner resource manager. Otherwise, the transaction manager can roll back the in-doubt transaction.

Application Server (e.g., Multi-Tenant, MT) Environment

Figure 1:
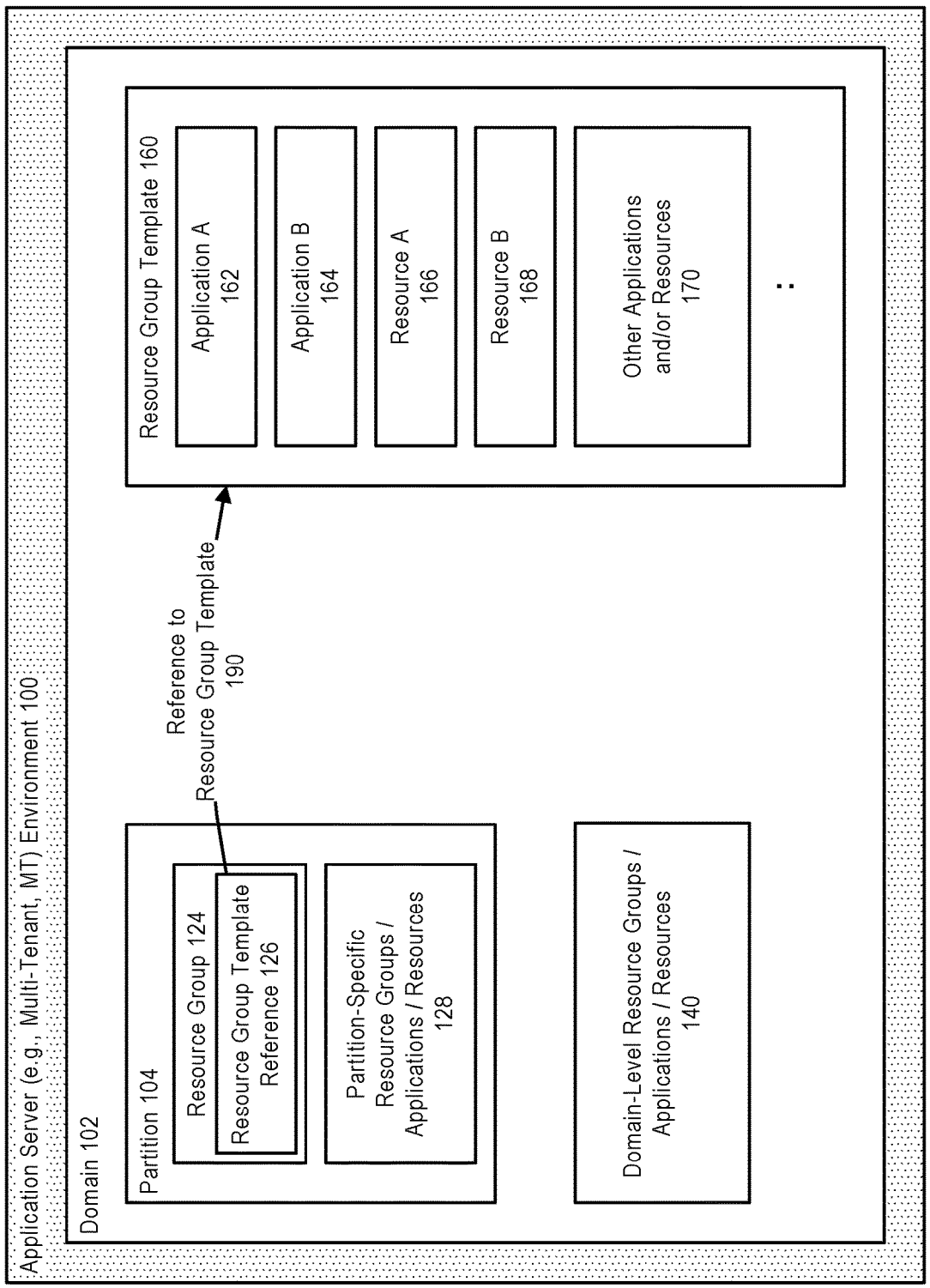
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
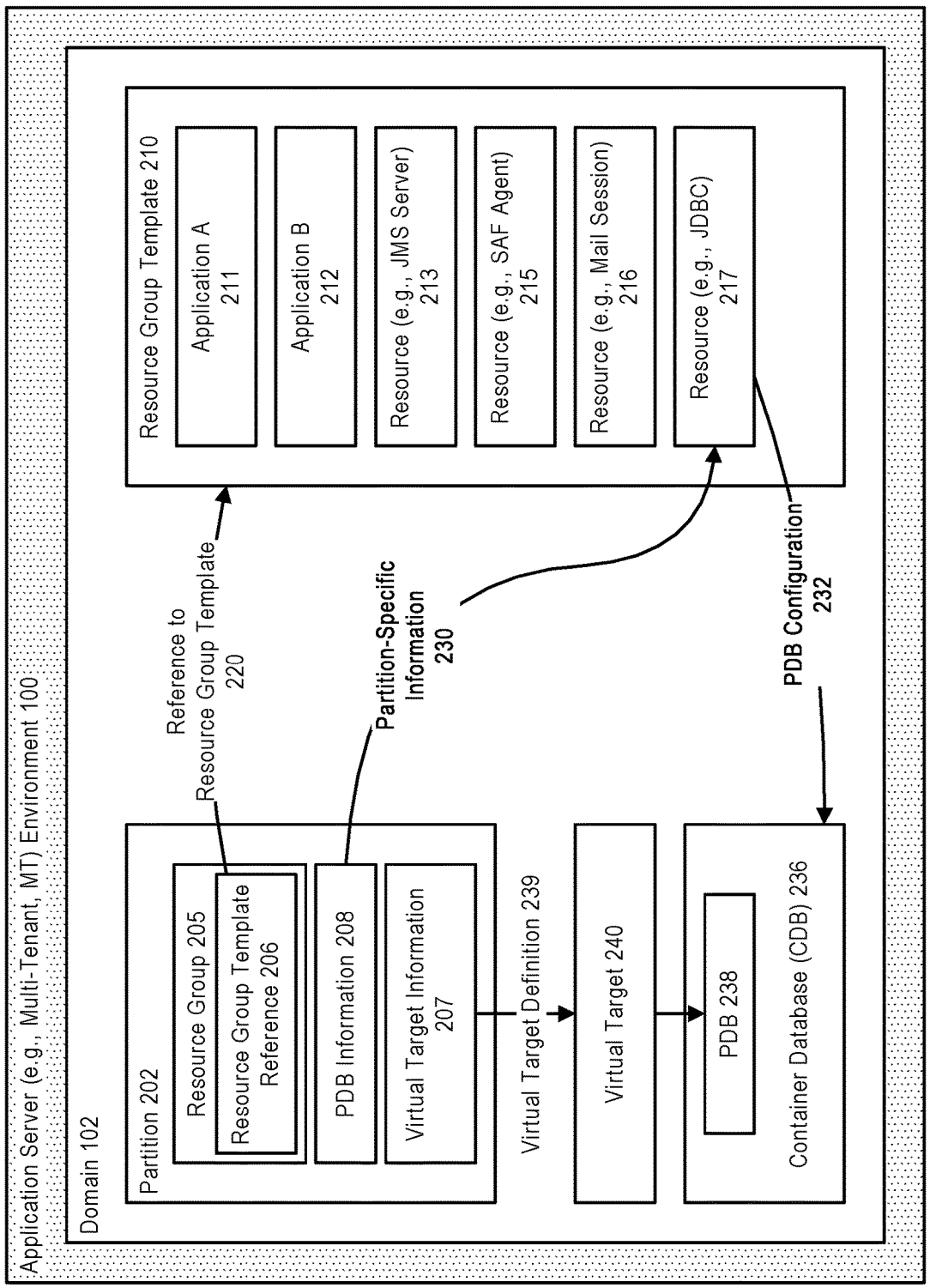
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
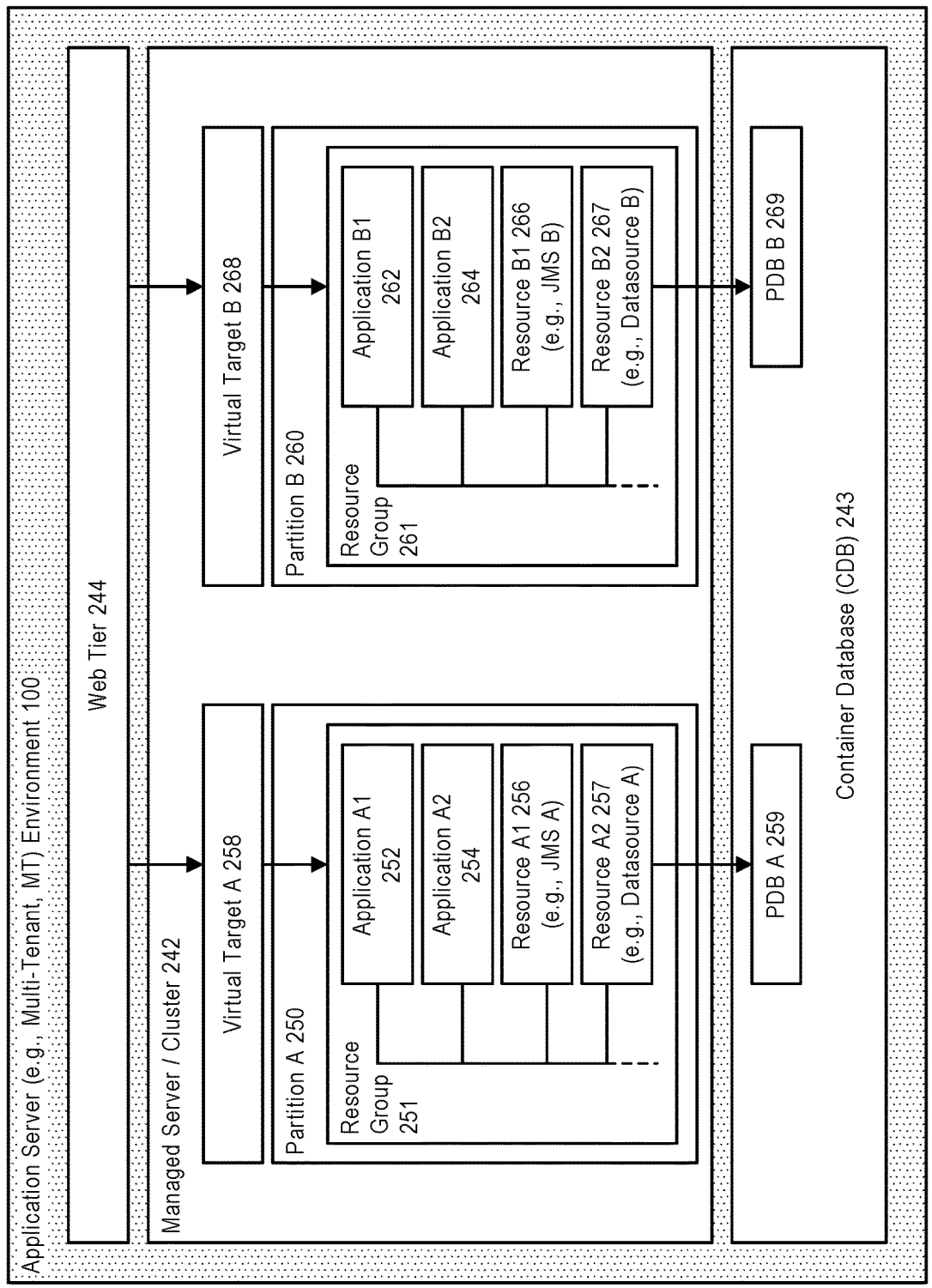
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level-partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
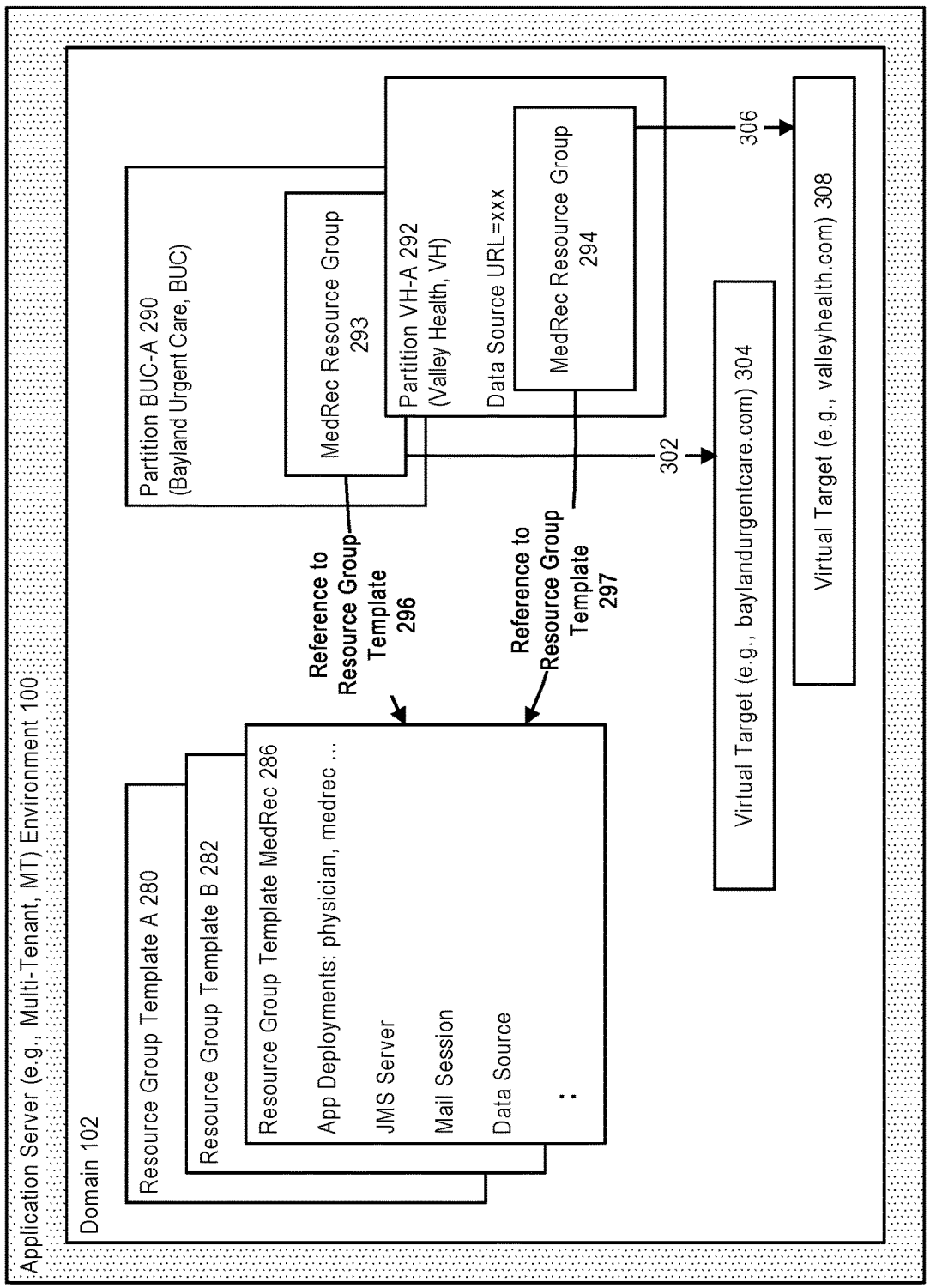
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
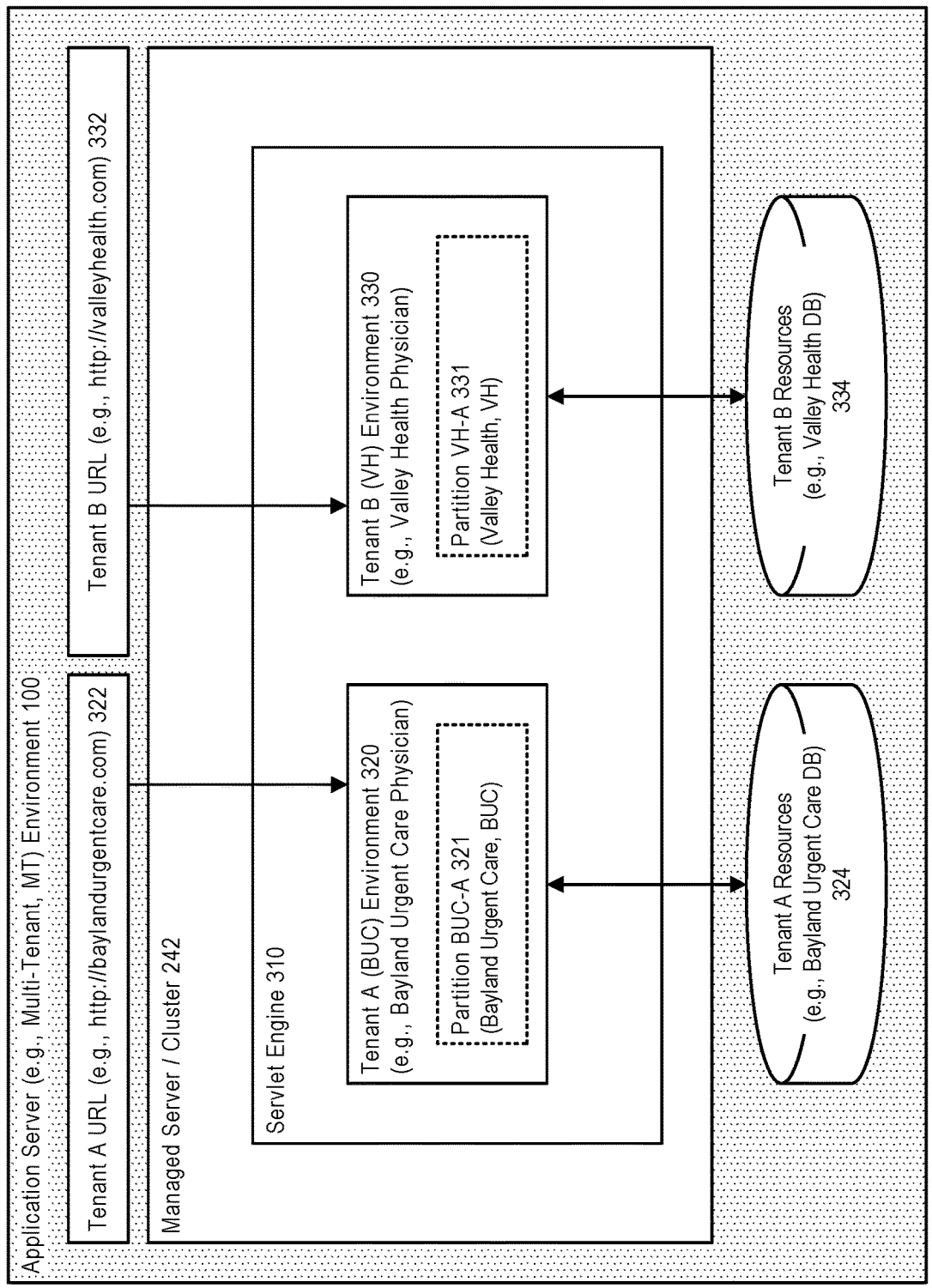
FIG. 5 further illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

Transactional Environment and Global Transaction

Figure 6:
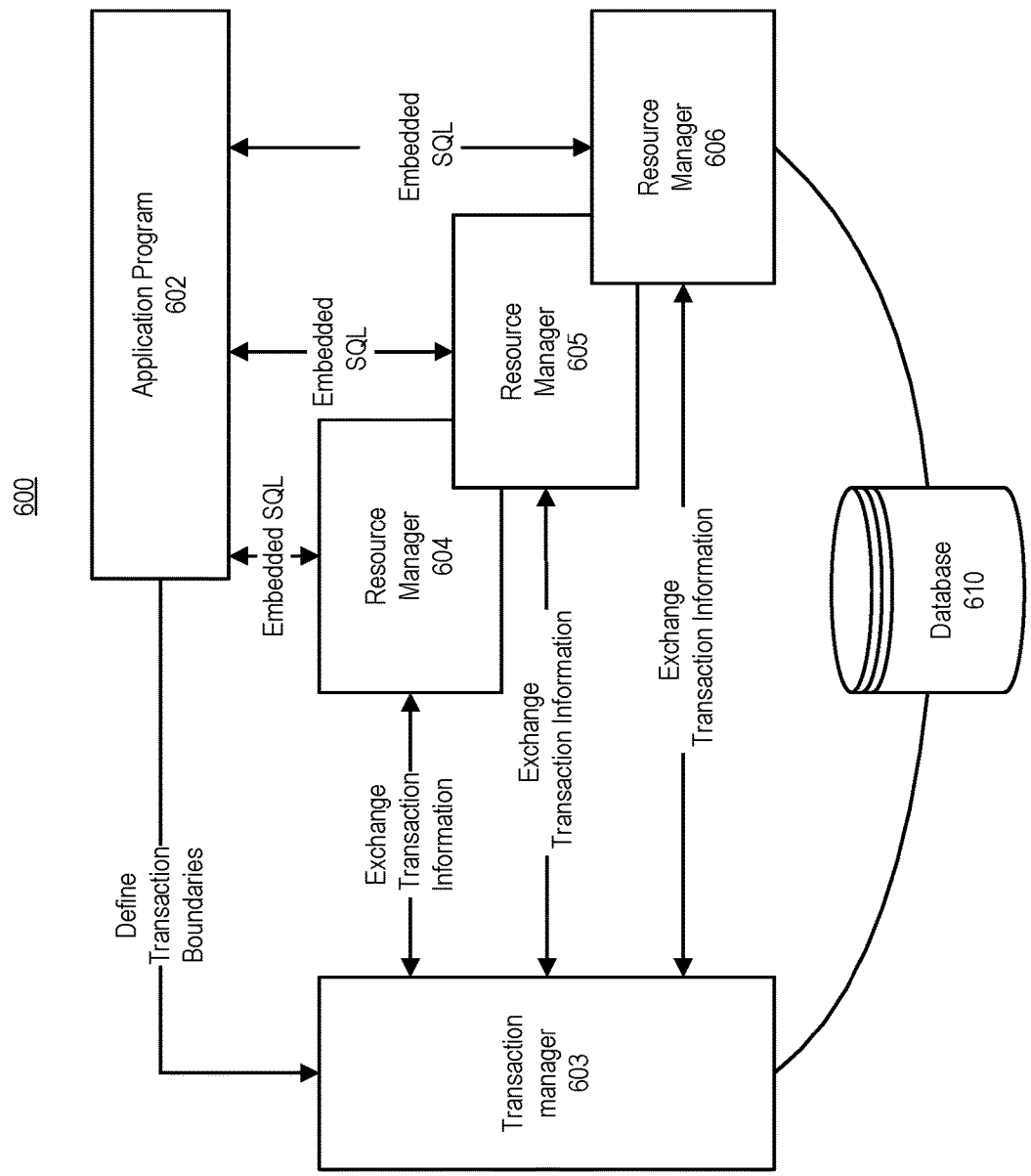
FIG. 6 shows an illustration of a transactional environment, in accordance with an embodiment of the invention.

FIG. 6 shows an illustration of a transactional environment, in accordance with an embodiment of the invention. As shown in FIG. 6, a transactional environment 600 can include an application program 602, one or more transaction managers (TM) 603, a plurality of resource managers (RM) 604-606, and one or more persistence stores, e.g. the database 610.

In accordance with an embodiment of the invention, the application program 602 can specify actions that constitute a transaction. As illustrated, the application program 602 communicates with the transaction manager 603 to begin, commit, or abort a transaction, and the transaction manager 603 can send back the start, end, and disposition of the transaction to the application program 602. Furthermore, the application program 602 can define transaction boundaries for the transaction manager 603, which can exchange transaction information with the plurality of resource managers (RM) 604-606. In addition, the application program 602 can communicate with the plurality of resource managers 604-606 via Embedded Structured Query (SQL) to do work.

The plurality of resource managers 604-606 can provide access to persistence stores, e.g. the database 610 (or databases). In accordance with an embodiment of the invention, the plurality of resource managers 604-606 can implement XA (eXtended Architecture) interfaces to handle database connections and disconnections transparently to persistence stores. The XA interfaces can be based on a specification that describes a protocol for transaction coordination, commitment, and recovery. An XA resource participating in a transaction can comprise an XA resource manager and a backend persistence store.

In accordance with various embodiments of the invention, a transactional system can support a global transaction, which can be executed on more than one server, and is capable of accessing data from more than one resource manager.

A global transaction can be treated as a specific sequence of operations that are characterized by four properties, namely atomicity, consistency, isolation, and durability (ACID). The global transaction can be a logical unit of work where all portions of the transaction either succeed or have no effect. As well, operations are performed that correctly transform the resources from one consistent state to another. Additionally, within a global transaction, intermediate results are not generally accessible to other transactions, although other processes in the same transaction may access the data. As well, effects of a completed sequence of a global transaction are not generally altered by failure.

Furthermore, a global transaction, in accordance with an embodiment, may include several local transactions, each accessing a single resource manager. A local transaction can access a single database or file and can be controlled by the resource manager responsible for performing concurrency control and atomicity of updates at that distinct database. A given local transaction may be either successful or unsuccessful in completing its access.

In accordance with an embodiment, the transaction manager 603 can assign global transaction identifiers (GTRIDs) to the different transactions in transactional environment 600. The transaction manager 603 can monitor the progress of the transaction, and take responsibility for ensuring transaction completion and providing failure recovery. In addition, the transaction manager 603 can communicate with the plurality of resource managers 604-605 via XA interfaces to exchange transaction information, such as sending two-phase commits calls to the resource managers 604-605.

Two-phase Commit (2PC)

A two-phase-commit (2PC) protocol can be used to execute a transaction, such as a loosely-coupled global transaction. The two-phase-commit protocol (2PC) can include a prepare phase and a commit phase. In the prepare phase, a coordinating transaction manager (TM) instructs the participating resource managers (RMs) to take the necessary steps for either committing or aborting the transaction. In the commit phase, the transaction manager (TM) decides whether to commit or abort the transaction, based on the results of the prepare phase.

Figure 7:
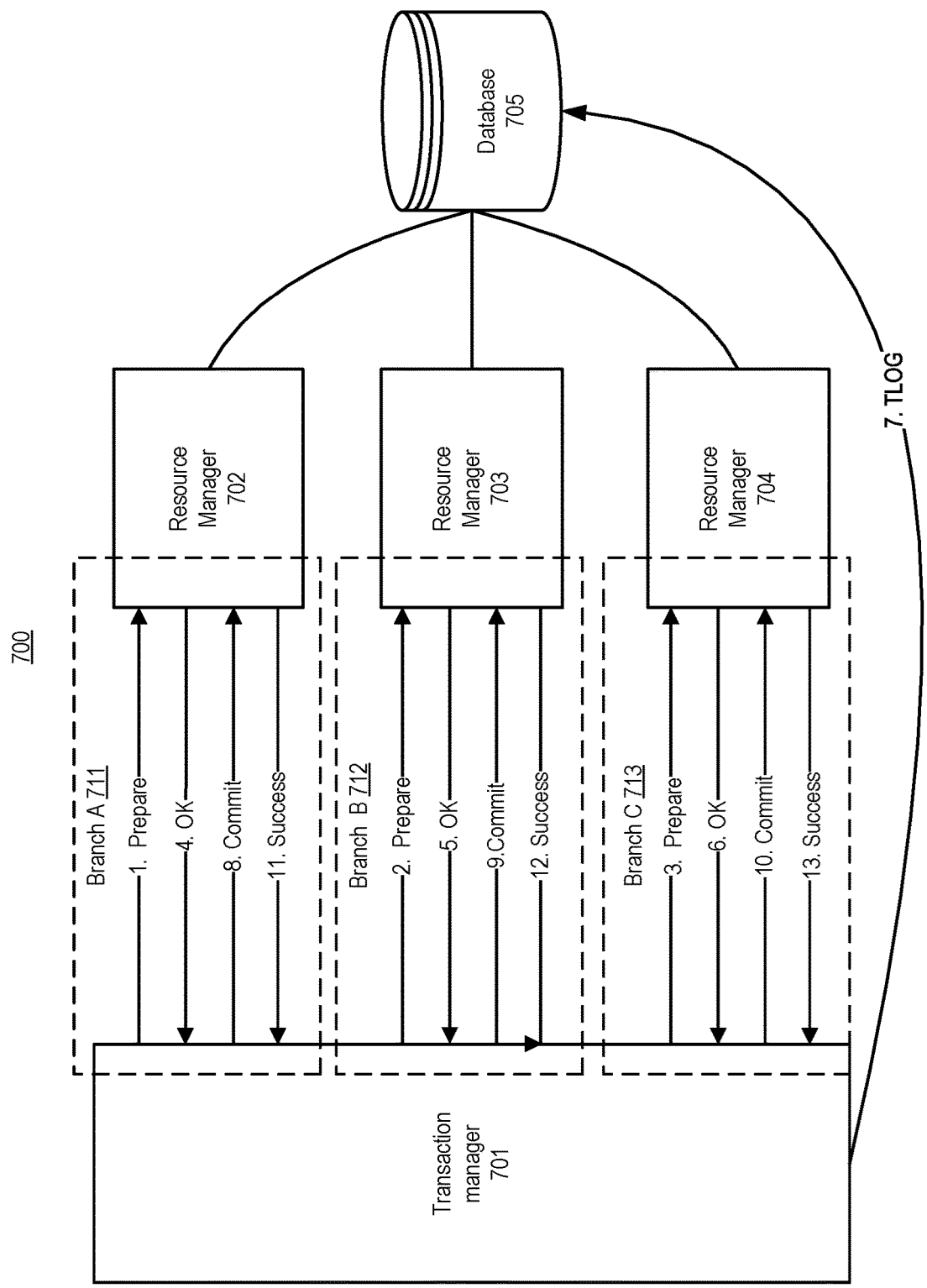
FIG. 7 shows an illustration of supporting two-phase commit in a transactional middleware machine environment.

FIG. 7 shows an illustration of supporting two-phase commit in a transactional middleware machine environment. As shown in FIG. 7, a transactional environment 700 can include a transaction manager 701 that supports the execution of various transactions, and one or more resource managers 702-704 that manage one or more data sources, e.g. a database 705.

For example, the transaction manager 701 can execute a transaction that involves transaction branch A 711, transaction branch B 712, and transaction branch C 713, each of which can be executed against a resource manager 702-704 respectively. If any branch fails in the transaction, the transaction manager 701 can help the resource manager 702-704 decide whether to commit, or roll back, the transaction.

As shown in FIG. 7, the transaction manager 701 can send a prepare instruction to the resource manager 702-704 on all three branches (steps 1, 2, and 3). After the resource managers 702-704 return an "OK" vote (steps 4, 5 and 6), the transaction manager 701 can write a transaction log (TLOG) to the database 705 (step 7).

The transaction log may be written either to files, or to a database, so that the transaction manager 701 can have enough information to recover the transaction if any branch fails during the commit phase.

Then, the transaction manager 701 can instruct the resource manager 702-704 to commit all three branches (steps 8, 9 and 10). The resource manager 702-704 can inform the transaction manager 701 after successfully completing the commit phase (steps 11, 12 and 13).

Transaction Recovery Based on a Transaction Log (TLOG)

In accordance with one embodiment of the invention, a transaction log (TLOG) can store the decisions for committing transactions by a transaction manager. For example, the TLOG can store a resource checkpoint record, which can be persisted by the transaction manager to enable it to track the different participating XA resources.

A transaction can be written in the TLOG when a transaction manager receives a success vote from all transaction branches after the prepare phase. The transaction record in TLOG can include at least a transaction identifier (XID), which further includes a GTRID assigned by a transaction manager, and a local XID assigned by a resource manager where the transaction is executed.

Furthermore, the TLOG can hold records of the state of in-flight transactions that are marked to be committed. The TLOG is beneficial to recover in-doubt transactions, which are transactions that have been prepared but have not yet been committed in a mid-tier transactional system, for example, after a system crash. Without recovering the in-doubt transactions, the system can be in an incorrect and inconsistent state after a crash.

For example, if a system fails during a two-phase commit transaction, the updates to one backend data store may have committed, but the updates to another data store, in the same transaction, may not yet have been instructed to commit, i.e., the data store's updates are still pending. Once the failed parts of the system have been re-started, the data stores holding pending updates may not be able to know whether the updates should be committed or rolled-back.

Figure 8:
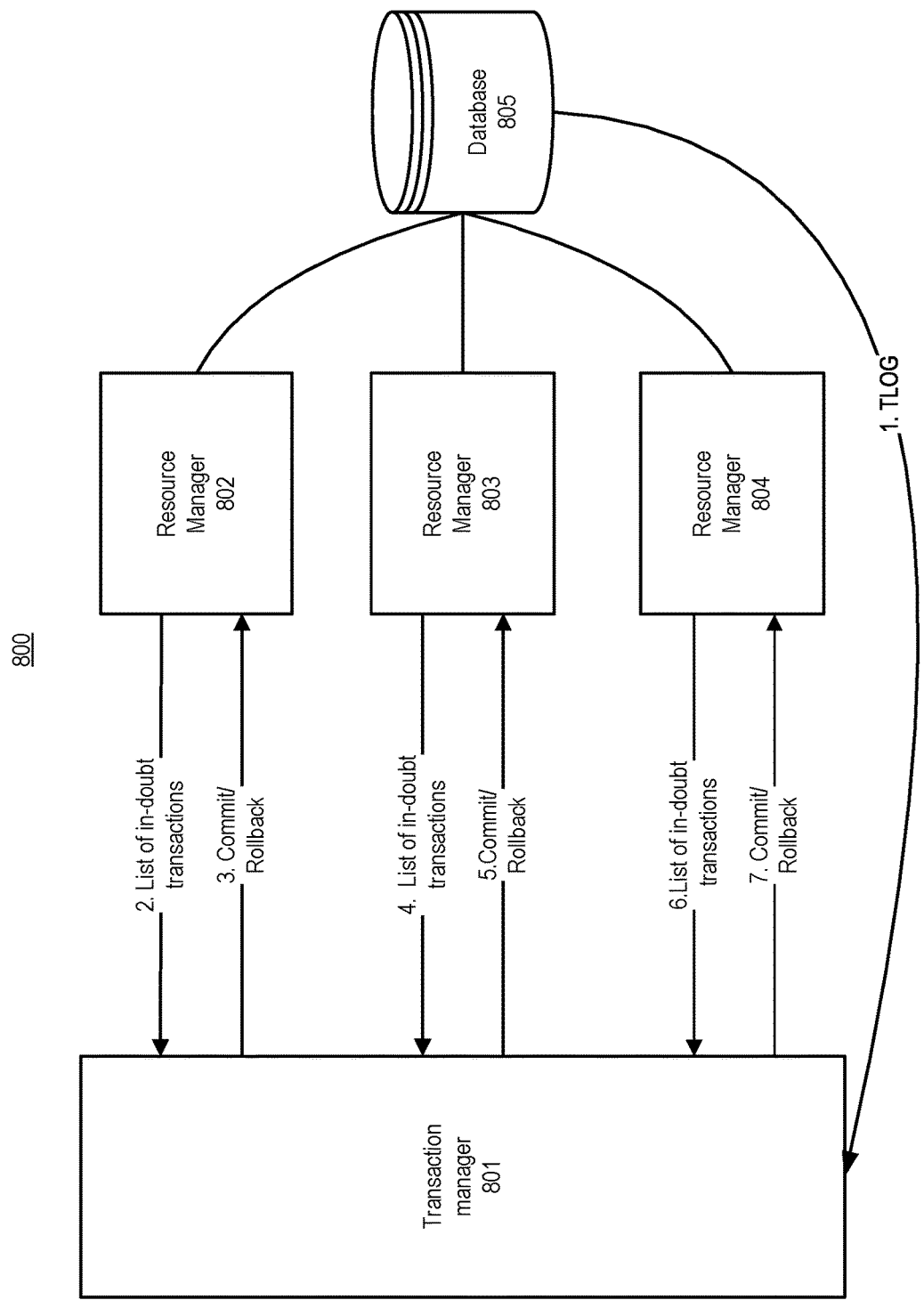
FIG. 8 shows an illustration of recovering in-doubt transactions in a transactional middleware machine environment.

FIG. 8 shows an illustration of recovering in-doubt transactions in a transactional middleware machine environment. As shown in FIG. 8, the transactional middleware machine environment 800 includes a transaction manager 801, and a plurality of resource managers 802-804, and a persistence store, i.e. a database 805.

The transaction manager 801 can automatically determine whether a global transaction is in-doubt, by reading/referring to the TLOG (step 1). Then, the transaction manager 801 can poll the relevant backend data stores of the participating resource managers 802-804. Each of the participating resource managers 802-804 can return a list of in-doubt transactions, which are the transactions that the transaction manager 801 does not know whether to roll it back or commit (steps 2, 4 and 6).

Furthermore, the transaction manager 801 can match each in-doubt transaction with the TLOG, and proceed to either commit or roll back the in-doubt transactions on different resource managers 802-804 (steps 3, 5 and 7). For example, when an in-doubt transaction appears in the TLOG, an XAResource.commit( ) can be called to commit the in-doubt transaction to a resource manager specified in the TLOG. On the other hand, when a transaction is not in the TLOG, i.e., a commit decision has not been made on the transaction before a crash, an XAResource.rollback( ) can be called to roll it back on a resource manager based on the transaction identifier (XID).

As shown in FIG. 8, a transaction may have been prepared on a resource manager 802 and the system crashes before the resource manager 802 can send the success vote to the transaction manager 801. Then, the transaction manager 801 may not be able to receive a success vote from all transaction branches, and therefore can be unable log the transaction in the TLOG. Accordingly, the transaction manager 801 can roll back all branch transactions on their respective resource managers 802-804. Thus, using such a consistent and predictable transaction recovery approach, a transaction manager can avoid a mixed heuristic completion where some branches are committed and some are rolled back.

Alleviating the Need for Transaction Manager Recovery Logs

In a transactional environment, the need to persist recovery information to stable storage in order to conduct recovery and ensure ACID properties is generally a design requirement of two-phase. However, the need to persist recovery information to stable storage (e.g., TLOG), alongside the actual protocol network calls to resource managers, can inflict performance cost for 2PC transactions. It can also carry a significant asset capacity cost due to the shared file system or database storage necessary for highly-available stable storage as well as administrative cost due to the management of this storage. These costs only escalate in the case of site-wide disaster recovery where (synchronous) replication and management of the same are necessary. In such systems, a database residing near a primary site is accessed from an application server on a secondary active site and this database in turn must be synchronously synced to a secondary/standby site. In this very common case, it is often necessary to communicate across at least two sites (and back again) intentionally separated by a distance and force to stable storage on both of these sites for every single transaction.

For example, a typically 2PC transaction utilizing the XA two-phase logging algorithm can involve the following steps. The application can use multiple XA resources in a transaction and issues commit for the transaction. The transaction manager can then issue prepare (e.g., XAResource.prepare) on all XA resource participants (e.g., resource managers). The transaction manager can then persist a transaction log to a stable storage (e.g., a database), where the transaction log contains at least the format id and global transaction id of the transaction. After receiving successful (OK) votes from the resource managers, the transaction manager can issue commit (XAResource.commit) on all the XA resource participants. The transaction manager can then (generally lazily, in batches, etc.) purge/delete the transaction record. In the event of failure, the persisted transaction records are matched to the in-doubt transaction IDs returned from XAResource.recover calls made on all involved resource managers and recovery by commit or rollback is conducted accordingly.

In accordance with an embodiment, alleviating the need for transaction manager to record and persist recovery logs can be an optimization that can provide a significant improvement over existing systems by alleviating the need for extra communication and persistence overhead In accordance with an embodiment of the invention, by using a technique involving strict ordering of two-phase commit calls and the classification of at least one resource participant as a determiner resource of recovery, it is possible to alleviate the need for transaction logs while still providing transaction recovery and ACID properties.

In accordance with an embodiment, a transaction manager can utilize multiple resources in a transaction and issue commit for the transaction. A certain resource of the multiple resources can be configured to be designated as the determiner (also referred to herein as determiner resource and determiner resource manager) of transaction. In the case of a multitenant application server environment, a partition can specify at least one partition specific determiner resource per transaction. If no determiner resource is configured/elected the transaction system can nominate one and persist the determiner resource in a configuration. If no determiner resource is configured in a multitenant application server environment, an application, such as an application associated with an instantiated resource group within a partition, can nominate a partition specific determiner resource and persist this partition specific determiner resource in a configuration.

In accordance with an embodiment, when a group (e.g., combination) of resources, including the resource designated as the determiner resource, are first used, or a new combination of resources is first used in a two-phase transaction, the combination of resources (i.e., combination of resource managers) can be captured and persisted in configuration automatically by the transaction processing subsystem. This configuration persistence occurs just before the first prepare issued for such a transaction. If this configuration change fails the transaction can be rolled back. While not necessary, this can provide further optimization as it reduces the set of resources that require XAResource.recover calls during recovery.

In accordance with an embodiment, during a transaction where a resource is designated as the determiner resource and strict ordering is enforced, the transaction manager forgoes any transaction logging. The transaction manager can issue prepare (XAResource.prepare) on all resource participants, preparing the "determiner" resource last. If the prepare call on a resource other than the determiner resource fails, the determiner will not be prepared and the transaction can be rolled back. If a failure occurs during the prepare of the determiner resource, all non-determiner resources can be rolled back, followed by the rollback of the determiner resource.

In accordance with an embodiment, the transaction manager can issue commit on the resources in the transaction only once determiner resource has indicated it has successfully prepared. Then, the transaction manager can issue commit (XAResource.commit) The transaction manager issues XAResource.commit on all XA resource participants, committing the determiner resource last. As with the prepare call, the determiner resource will not commit until all non-determiner resources have successfully committed. A global retry commit can be issued until an abandonment timer expires.

In accordance with an embodiment, in the event of failure, a XAResource.recover scan can be conducted on all non-determiner resources in configuration and the in-doubt transaction IDs are matched to the in-doubt transaction IDs returned from the determiner resource's XAResource.recovery. Recovery by commit can be issued if there is a match (e.g., existing transaction ID) in the determiner resource's list. Alternatively, a rollback can be issued can be issued if a match is not found.

The above-described technique can be described in more details in the following sections.

A Strict Ordering of the Two-phase Commit (2PC) Calls

In accordance with an embodiment of the invention, the system can eliminate mid-tier transaction logs (TLOGs) in processing a transaction, based on a strict ordering of the two-phase commit calls.

Figure 9:
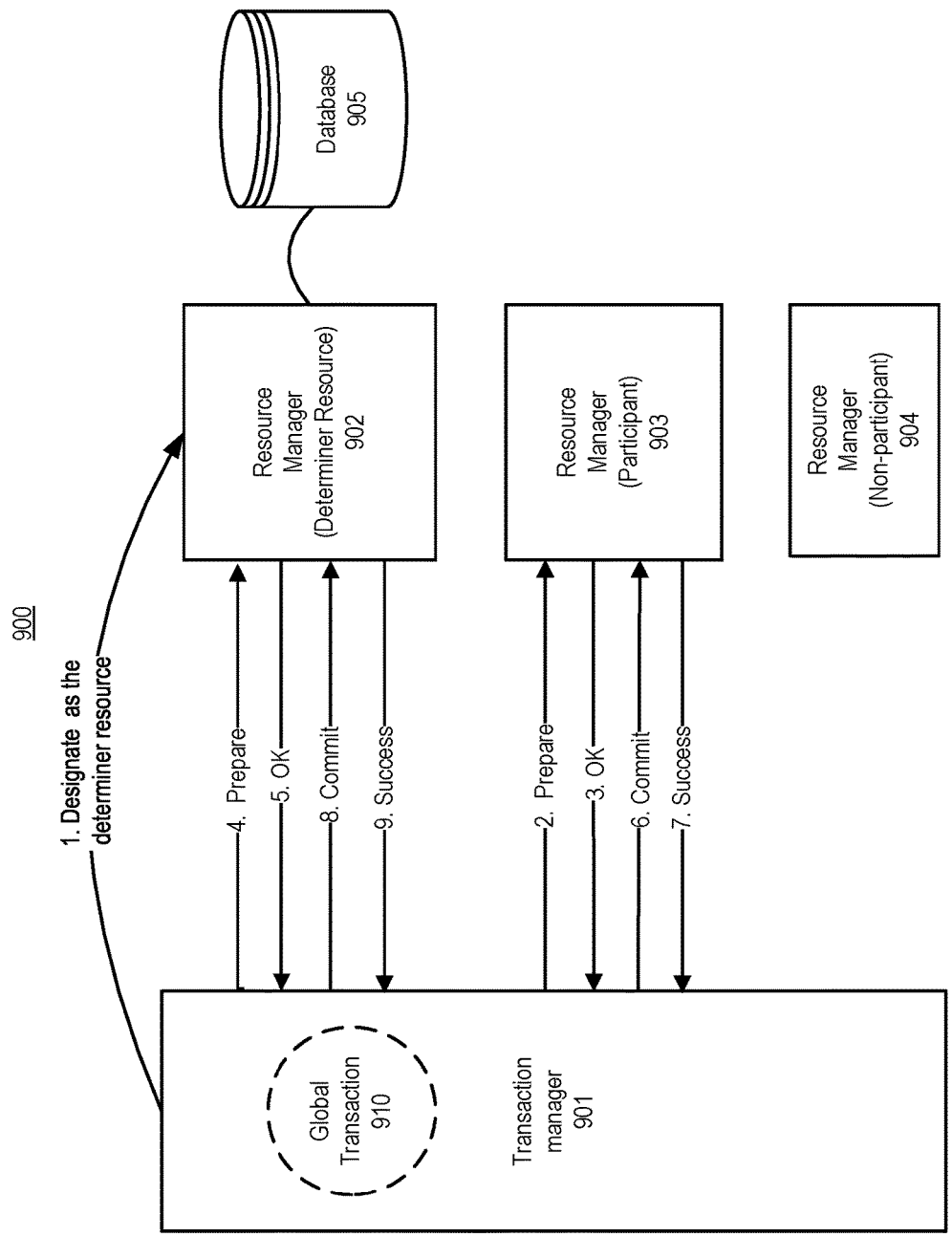
FIG. 9 shows an illustration of supporting a strict ordering of two-phase commit (2PC) calls for processing a transaction in a transactional middleware machine environment, in accordance with an embodiment.

FIG. 9 shows an illustration of supporting a strict ordering of two-phase commit (2PC) calls for processing a transaction in a transactional middleware machine environment, in accordance with an embodiment. As shown in FIG. 9, a transaction 910, such as a global transaction, can be supported in a mid-tier transactional system 900 that includes a transaction manager (TM) 901, a plurality of resource managers (RMs) 902-904. The resource managers (RMs) 902-903 participate in the global transaction 910, and the resource manager 904 does not participate in the global transaction 910. In accordance with an embodiment, the transaction 910 does not span multiple transactional managers.

In accordance with an embodiment, the resource manager 902 can be designated as the determiner resource for the transaction depicted in FIG. 9. This designation can be performed, for example, by the transaction manager, or by a partition, in which situation the determiner resource would be a partition specific determiner resource that is not accessible from another partition. The designation of the resource manager (RM) 902, as the determiner resource, can be persisted in the configuration for the transaction machine environment. When no determiner resource is designated in a transaction in configuration, the transaction manager 901 can nominate a data source as the determiner resource (step 1) and persist it in the configuration. Additionally, the determiner resource 902 can be a resource other than a database, such as a message queue.

Furthermore, whenever a resource is first used or a new combination of resources is first used in processing the two-phase global transaction 910, the new resource or the new combination of resources can be captured and persisted in the configuration, such as a configuration file, automatically by the transaction manager 901. This configuration persistence can occur before the first prepare request is issued for the two-phase transaction. If this configuration change fails, the transaction 910 can be rolled back.

In accordance with an embodiment of the invention, the transaction manager 901 can ensure that the determiner resource, e.g. resource manager 902, is prepared last, and if all resource managers return a vote of okay after the prepare, the transaction manager can also ensure that the determiner resource 902 is committed last among all participating resource managers, for a 2PC transaction 910.

As shown in FIG. 9, the transaction manager 901 can first prepare the resource manager (RM) 903 (step 2), before preparing the determiner resource (step 4). After receiving an OK vote from the participating resource managers (RMs) 902-903 (steps 3 and 5), the transaction manager 901 can commit the resource manager (RM) 903 (step 6), followed by the determiner resource (step 8). The transaction can be completed after the transaction manager 901 receives a success indication from each of the resource managers 902-903 (steps 7 and 9).

By forcing a strict ordering of the commit and prepare calls, the transaction manager 901 can forgo any logging of resources/checkpoints, including writing a TLOG after the prepare phase is handled successfully. The system can improve the performance of the transaction, while allowing the mid-tier transactional system 900 to recover the transaction 910 by retrieving a list of in-doubt transactions from each resource manager, and subsequently recovering all in-doubt transactions without using a transaction log by comparing the list of in-doubt transactions retrieved from each resource manager (e.g., RM 903 in the embodiment depicted in FIG. 9) other than the determiner resource manager (e.g., determiner RM 902 in FIG. 9) with the list of in-doubt transactions retrieved from the determiner resource manager.

Recovering in-doubt transactions can involve comparing a list of in-doubt transactions retrieved from each resource manager other than the determiner resource manager with the list of in-doubt transactions retrieved from the determiner resource manager; and then rolling back the in-doubt transactions which appear in the list of in-doubt transactions retrieved from each resource manager other than the determiner resource manager but do not appear in the list of in-doubt transactions retrieved from the determiner resource manager. By enforcing the strict ordering of the 2PC transaction, the system can recover a failed transaction by comparing the logs of each resource manager with the log of the final, determiner resource manager.

In accordance with an embodiment, because the determiner resource manager is the resource manager last to be prepared, if the determiner resource manager is prepared then all of the preceding resource managers must have been prepared. If the determiner resource has been successfully prepared, the transaction manage then is able to determine that all other resource managers have successfully been prepared, and therefore it is safe to commit the transaction on all resource managers during a recovery. If only some of the resource managers have been prepared, but the determiner resource manager (last in line) has not been prepared, then the transaction manager can determined that the prepare phase did not complete and the transaction must be rolled back during recovery. The analysis relies on only on comparing the in-doubt (prepared but not committed) transactions of the participating resource managers and the determiner resource manager and eliminates the need to use a separate transaction log.

Recovering a Global Transaction without Using a TLOG

Figure 10:
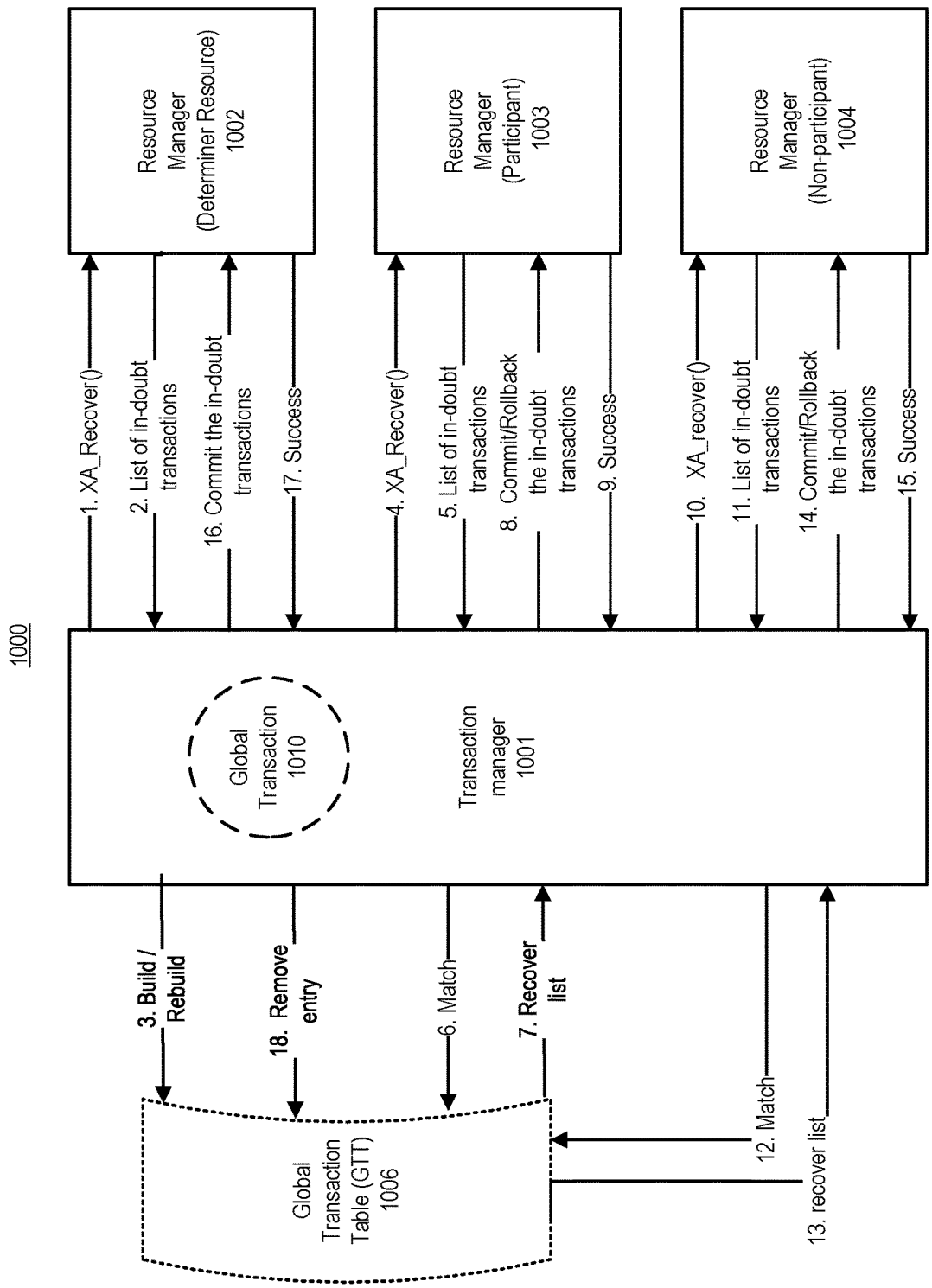
FIG. 10 shows an illustration of recovering a global transaction without using a transaction log (TLOG), in accordance with an embodiment.

FIG. 10 shows an illustration of recovering a global transaction without using a transaction log (TLOG), in accordance with an embodiment. As shown in FIG. 10, a 2PC transaction 1010, such as a global transaction, can be supported in a mid-tier transactional system 1000 that includes a transaction manager (TM) 1001, a plurality of resource managers (RM) 1002-1004.

When the transaction 1010 needs to be recovered, such as after a failure, the transaction manager 1001 can attempt to recover, e.g. by placing an XA_recover( ) call, on the determiner resource 1002 (step 1). The transaction manager 1001 can receive a list of in-doubt transactions (prepared but not committed transactions) from the determiner resource 1002 (step 2). Furthermore, the transaction manager 1001 can use the list of in-doubt transactions to build/rebuild the global transaction table (GTT) 1006 (step 3).

In accordance with an embodiment, when the determiner resource 1002 is successfully prepared in the two-phase commit transaction, the list of in-doubt transactions can be identical to mid-tier outstanding transactions that the transaction manager 1001 has instructed the participating resource managers 1002-1003 to commit.

Then, the transaction manager 1001 can attempt to recover, e.g. by placing an XA_recover( ) call, on all the other resource managers in the transactional mid-tier system 1000, including the participating resource manager 1003 (step 9) and the non-participating resource manager 1004 (step 10).

For example, the transaction manager 1001 can receive a list of in-doubt transactions from the participating resource manager 1003 (step 5). The transaction manager 1001 can match the in-doubt transactions in the list with the GTT 1006 table to generate a recover list (steps 6 and 7). Then, the transaction manager 1001 can recover the participating resource manager 1003 based on the recover list (step 8). For example, the transaction manager 1001 can commit the in-doubt transactions that match the GTT 1006 table, and can roll back the in-doubt transactions that do not match the GTT 1006 table.

The above procedures can be performed on the resource manager 1004, which is a non-participating resource. As illustrated in FIG. 10, after placing an XA_recover( ) call on the resource manager 1004, the transaction manager 1001 can receive a list of in-doubt transactions (step 11), which can be matched with the GTT 1006 to generate a recover list (step 12). Then, the transaction manager 1001 can commit/rollback the in-doubt transactions on the resource manager 1004 (steps 14 and 15).

Once all the other resource managers 1003-1004 are recovered (steps 9 and 15), the transaction manager 1001 can commit all transactions in the list of prepared transactions to the determiner resource manager (steps 16 and 17). Finally, transaction manager 1001 can remove the entries in the GTT 1006 (step 18).

In accordance with an embodiment, a transaction from the list of in-doubt transactions cannot be committed to the determiner resource manager 1002 until all other resource managers 1003-1004 have been recovered, even if one or more resource managers are not part of the transaction.

In accordance with an embodiment, the transaction manager 1001 can have knowledge of the participating resources 1002, 1003 of the transaction and additional information about the participating resources 1002, 1003 can be passed along and persisted to the determiner resource 1002 in the prepare phase. With the additional information, the transaction manager 1001 can commit the transactions in the list of in-doubt transactions returned from the determiner resource manager 1002, without waiting for all known resource managers 1002-1004 to recover. The transaction manager 1001 may only need to wait until all participants of the transaction, i.e., determiner resource manager 1002 and resource manager 1003, are recovered. Additionally, during a clean shutdown or restart of the transactional mid-tier system 1000, the configuration can be purged or marked, in such a way that unnecessary recovery and processing may be avoided during startup.

Recovering a Transaction without Using a TLOG in a Multitenant Environment

Figure 11:
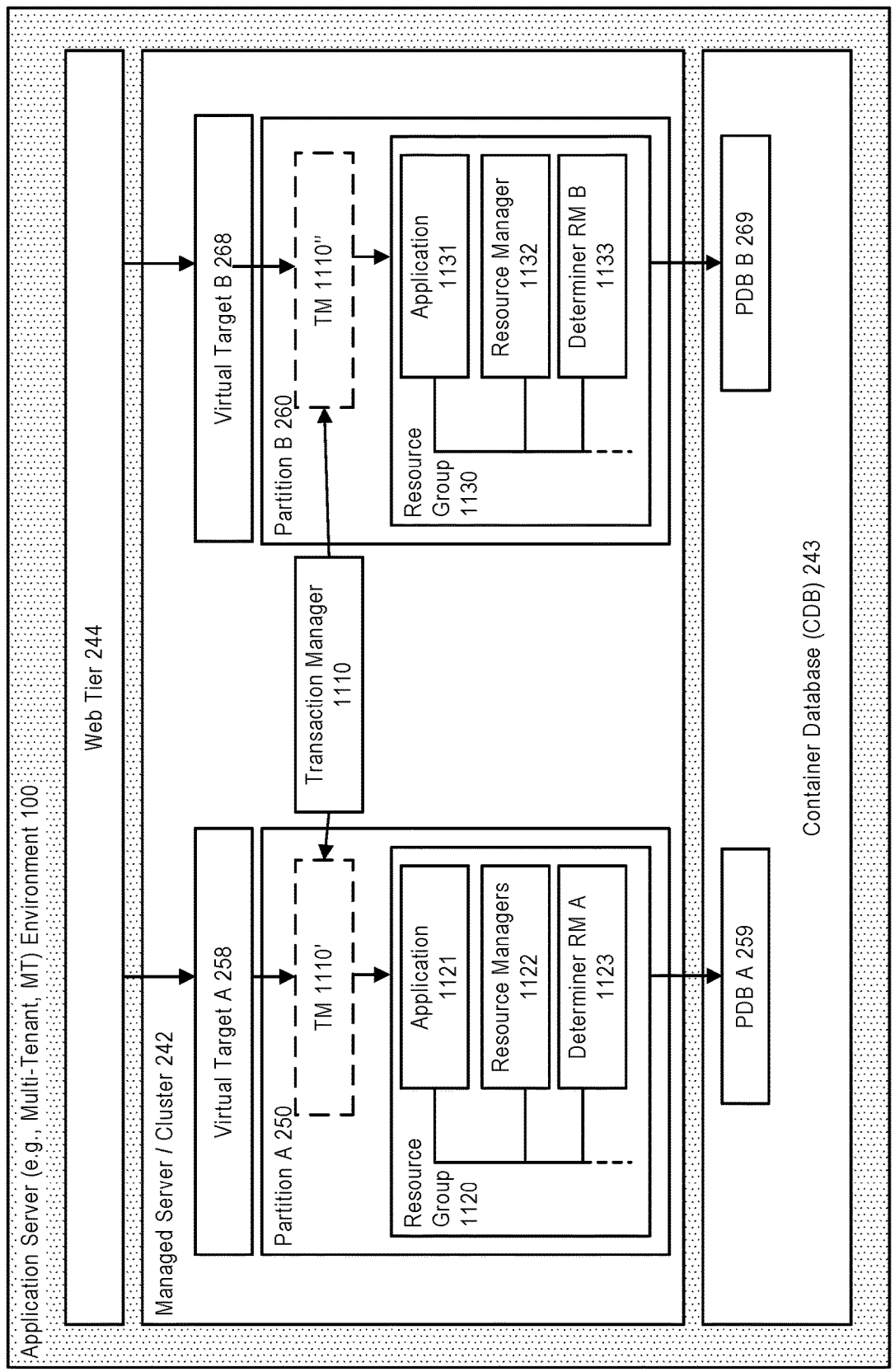
FIG. 11 shows an illustration of recovering a global transaction without using a transaction log (TLOG) in a multitenant application server environment, in accordance with an embodiment.

FIG. 11 shows an illustration of recovering a global transaction without using a transaction log (TLOG) in a multitenant application server environment, in accordance with an embodiment.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources and resource managers associated with that partition. For example, partition A can be configured to include a resource group 1120 which contains an application 1121, resource managers 1122, and a partition configured determiner resource manager A 1123, and wherein the partition is accessible via a virtual target A 258. Similarly, partition B 260 can be configured to include a resource group 1130 which contains an application 1131, resource managers 1132, and a partition configured determiner resource manager B 1133, and wherein the partition is accessible via a virtual target A 258. The managed server can additionally include a transaction manager 1110 which can be instantiated into each partition, as shown in the figure as TM 1110' and 1110".

In accordance with an embodiment, the system depicted in FIG. 11 can execute a two phase commit transaction utilizing the strict order as described above. For example, instantiated transaction manager 1110' can issue prepare calls to resources associated with an application executing in the context of partition A 250. A resource manager, resource manager 1123, can have been designated by the partition (e.g., at runtime or via a configuration file) as the determiner resource manager for the transaction. This designation can indicate that the determiner resource manager is a partition specific determiner resource manager, and thus is not accessible from another partition. The designation of the resource manager (RM) 1123, as the determiner resource, can be persisted in the configuration for the transaction machine environment.

In accordance with an embodiment of the invention, the transaction manager 1110' can ensure that the determiner resource, e.g. determiner resource manager 1123, is prepared last, and if all resource managers return a vote of okay after the prepare, the transaction manager can also ensure that the determiner resource manager 1123 is committed last among all participating resource managers, for a two phase commit transaction.

In accordance with an embodiment, because the determiner resource manager is partition specific, if a transaction within a partition fails, the system can still allow other transactions associated with other partitions to run (even if the determiner resource manager is the same as the determiner resource manager in another partition). Since each determiner resource manager is associated with a specific partition, the system can still have two partitions using the same resource, the system can still allow one partition to run while disallowing another. That is, because of the partition specific determiner resource, a failed transaction at one partition will not necessarily impact another partition running a transaction.

In accordance with an embodiment, the determiner resource managers associated with partitions can be partition specific. Because of this, and due to the fact that a resource can be partition specific, configuration of determiner resources at a partition level can be supported. As partition-specific resources can have their partition name concatenated to the resourcename, there are no issues with duplicate or overriding resource registrations. The can hold true for partitions that use the same resource group template—the resourcenames can be unique and so the determiner specifications remain unique to the partition. For example, partition A may have the same resource group template as partition B, which includes resource resourceA. In such a circumstances, however, partition A may configure resourceA a determiner resource because internally the resource-names are different, for example, resourceA_partitionA and resourceA_partitionB.

Figure 12:
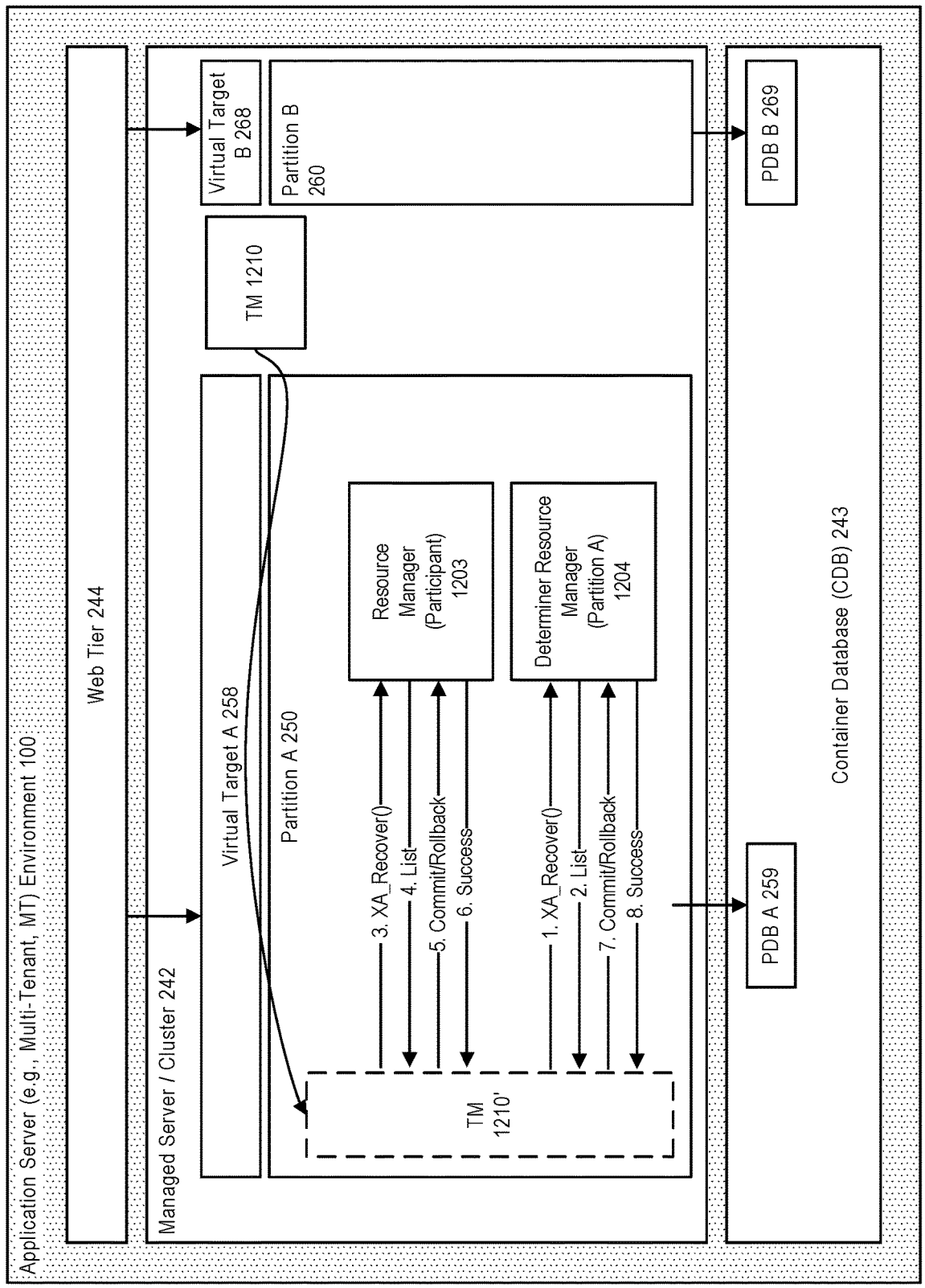
FIG. 12 shows an illustration of recovering a transaction without using a transaction log (TLOG), in a multitenant application server environment, in accordance with an embodiment.

FIG. 12 shows an illustration of recovering a transaction without using a transaction log (TLOG), in a multitenant environment, in accordance with an embodiment. As shown in FIG. 12, in accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated and resource managers with that partition. The managed server can additionally include a transaction manager 1210 which can be instantiated into each partition, as shown in the figure TM 1210'. Partition A 250 can include resource manager (participant) 1203 and determiner resource manager for partition A 1204.

In accordance with an embodiment, a 2PC transaction can be supported in a multitenant environment that includes a transaction manager (TM) 1210 instantiated in a partition (e.g., TM 1210'), a plurality of resource managers, for example resource managers (RM) 1203-1204. It should be noted that FIG. 12 only shows two resource managers participating in the transaction recovery for simplicity. It should be appreciated that a number of resource managers, both participating and non-participating, can also be included in the system.

When the transaction needs to be recovered, such as after a failure, the transaction manager can attempt to recover, e.g., by placing an XA_recover( ) call, on the determiner resource 1204 (step 1). The transaction manager can receive a list of in-doubt transactions (prepared but not committed transactions) from the determiner resource 1204 (step 2). Furthermore, the transaction manager 1001 can use the list of in-doubt transactions to build/rebuild a transaction table.

In accordance with an embodiment, when the determiner resource 1204 is successfully prepared in the two-phase commit transaction, the list of in-doubt transactions can be identical to mid-tier outstanding transactions that the transaction manager has instructed the participating resource managers 1203 to commit.

Then, the transaction manager can attempt to recover, e.g., by placing an XA_recover( ) call, on all the other resource managers, including the participating resource manager 1203 (step 3).

For example, the transaction manager can receive a list of in-doubt transactions from the participating resource manager 1203 (step 4). The transaction manager can match the in-doubt transactions in the list the transaction table to generate a recover list. Then, the transaction manager can recover the participating resource manager 1203 based on the recover list (step 5), and the resource manager 1203 can return a success (step 6). For example, the transaction manager can commit the in-doubt transactions that match the transaction table, and can roll back the in-doubt transactions that do not match the transaction table.

Once all the other resource managers 1203 are recovered, the transaction manager can commit all transactions in the list of prepared transactions to the determiner resource manager, which can return a success (step 8).

In accordance with an embodiment, a transaction from the list of in-doubt transactions cannot be committed to the determiner resource manager 1204 until all other resource managers have been recovered, even if one or more resource managers are not part of the transaction.

Figure 13:
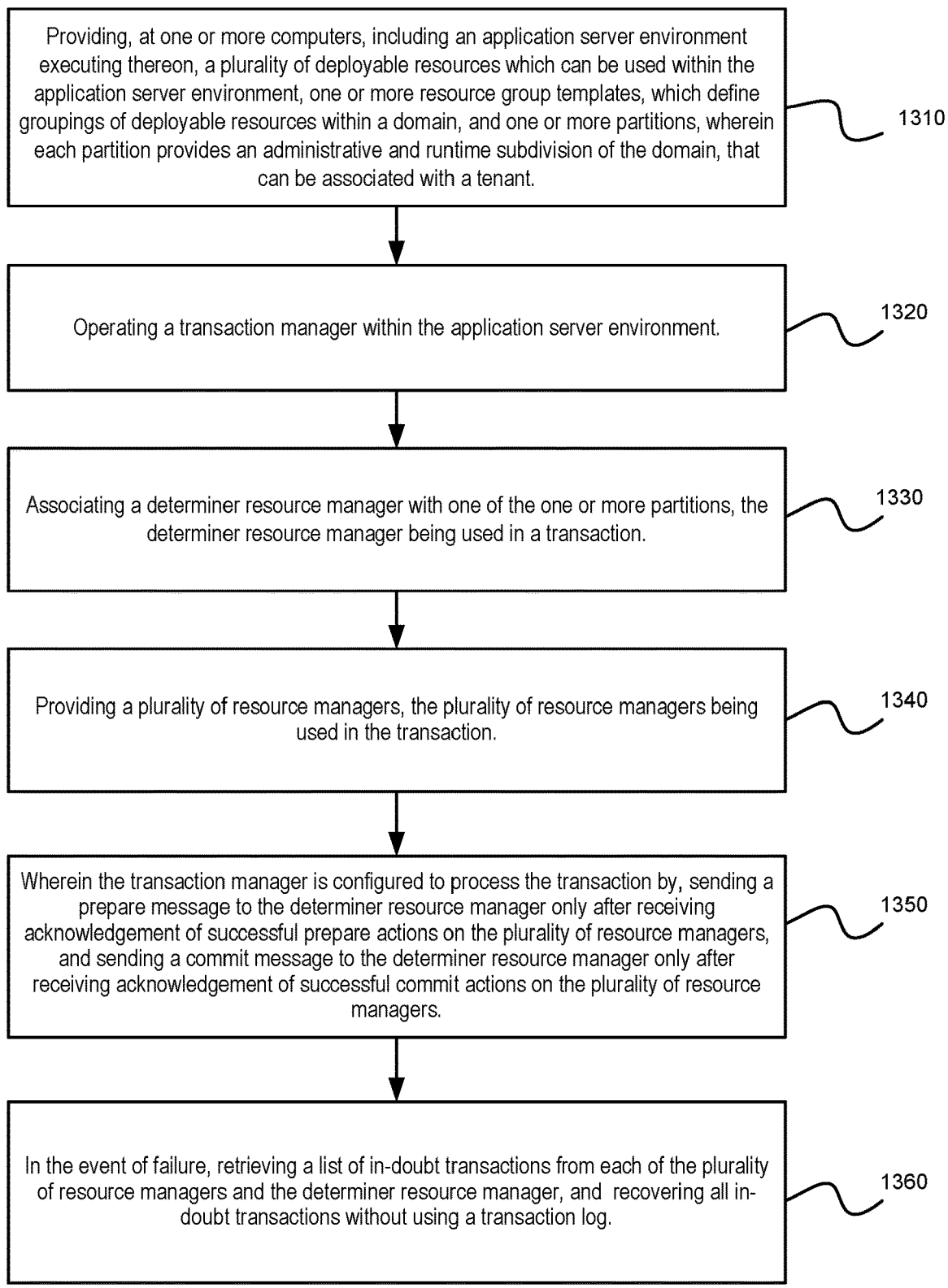
FIG. 13 is an illustrative flow chart of transaction recovery in a multitenant application server environment, in accordance with an embodiment.

FIG. 13 is an illustrative flow chart of transaction recovery in a multitenant application server environment, in accordance with an embodiment. As shown in FIG. 13, at step 1310, the method can provide, at one or more computers, including an application server environment executing thereon, a plurality of deployable resources which can be used within the application server environment, one or more resource group templates, which define groupings of deployable resources within a domain, and one or more partitions, wherein each partition provides an administrative and runtime subdivision of the domain, that can be associated with a tenant.

At step, 1320, the method can, as described above, operate a transaction manager within the application server environment.

At step 1330, the method can associate a determiner resource manager with one of the one or more partitions. Further, the determiner resource manager can be used in a transaction.

At step 1340, the method can provide a plurality of resource managers, where the plurality of resource managers are also used in the transaction.

At step 1350, transaction manager can process the transaction by sending a prepare message to the determiner resource manager only after receiving acknowledgement of successful prepare actions on the plurality of resource managers, and sending a commit message to the determiner resource manager only after receiving acknowledgement of successful commit actions on the plurality of resource managers.

In the event of a failure, at step 1360, the method can retrieve a list of in-doubt transactions from each of the plurality of resource managers and the determiner resource manager, and then recover all in-doubt transactions without using a transaction log The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for transaction recovery in a multitenant application server environment, comprising:
a computer that includes one or more processors and an application server executing thereon, and having a domain for execution of software applications, and one or more resources that are deployable to the domain for use by the software applications;
wherein the application server comprises a domain configuration that is used at runtime to define the domain for execution of the software applications, a plurality of partitions, and one or more resource groups,
wherein each partition, of the plurality of partitions, is associated with a partition identifier and a partition configuration, and provides an administrative and runtime subdivision of the domain, wherein each partition comprises one or more software applications, one or more resource groups of the partition and one or more resource group template references;
a transaction manager operating within the application server, wherein a plurality of instances of the transaction manager are instantiated, respectively, in each partition of the plurality of partitions;
wherein a transaction begins executing in the context of a partition of the plurality of partitions, the transaction utilizing resources of the partition, resource managers of the partition, an instance of the transaction manager that is instantiated in the partition, and a determiner resource manager of a plurality of determiner resource managers provided within the application server, the determiner resource manager being exclusively scoped to the partition;
wherein upon a failure of the transaction executing in the context of the partition based upon an indication from the determiner resource manager that is exclusive scoped to the partition, the instance of the transaction manager that is instantiated in the partition recovers in-doubt transactions associated with the transaction executing in the context of the first partition without affecting transactions executing in the context of any other partition.

2. The system of claim 1,
wherein partition is accessible by a virtual target.

3. The system of claim 1,
wherein a resource manager of the resource managers of the partition is configured as the determiner resource manager by a configuration file associated with the partition.

4. The system of claim 1,
wherein a resource manager of the resource managers of the partition is configured as the determiner resource manager by the instance of the transaction manager that is instantiated in the partition, wherein such configuration is stored at a configuration file associated with the partition.

5. The system of claim 1, wherein recovering the in-doubt transactions is performed without using a transaction log.

6. The system of claim 5, wherein recovering the in-doubt transactions comprises:
comparing a list of in-doubt transactions retrieved from each of the resource managers of the partition with a list of in-doubt transactions retrieved from the determiner resource manager; and
rolling back one or more in-doubt transactions which appear in the list of in-doubt transactions retrieved from each of the resource managers of the partition but do not appear in the list of in-doubt transactions retrieved from the determiner resource manager.

7. The system of claim 5, wherein recovering the in-doubt transactions comprises:
comparing a list of in-doubt transactions retrieved from each of the resource managers of the partition with a list of in-doubt transactions retrieved from the determiner resource manager; and
committing one or more in-doubt transactions which appear in the list of in-doubt transactions retrieved from each of the resource managers of the partition and which also appear in the list of in-doubt transactions retrieved from the determiner resource manager.

8. A method for transaction recovery in a multitenant application server environment, comprising:
providing, at one or more computers, an application server executing thereon, the application server comprising a domain for execution of software applications, and one or more resources that are deployable to the domain for use by the software applications;
wherein the application server comprises a domain configuration that is used at runtime to define the domain for execution of the software applications, a plurality of partitions, and one or more resource groups,
wherein each partition, of the plurality of partitions, is associated with a partition identifier and a partition configuration, and provides an administrative and runtime subdivision of the domain, wherein each partition comprises one or more software applications, one or more resource groups of the partition and one or more resource group template references;
operating a transaction manager within the application server, wherein a plurality of instances of the transaction manager are instantiated, respectively, in each partition of the plurality of partitions;
executing a transaction in the context of a partition of the plurality of partitions, the transaction utilizing resources of the partition, resource managers of the partition, an instance of the transaction manager that is instantiated in the partition, and a determiner resource manager of a plurality of determiner resource managers provided within the application server, the determiner resource manager being exclusively scoped to the partition;
upon a failure of the transaction executing in the context of the partition based upon an indication from the determiner resource manager that is exclusive scoped to the partition, recovering, by the instance of the transaction manager that is instantiated in the partition, in-doubt transactions associated with the transaction executing in the context of the first partition without affecting transactions executing in the context of any other partition.

9. The method of claim 8,
wherein partition is accessible by a virtual target.

10. The method of claim 8,
wherein a resource manager of the resource managers of the partition is configured as the determiner resource manager by a configuration file associated with the partition.

11. The method of claim 8, further comprising:
configuring a resource manager of the resource managers of the partition as the determiner resource manager by the instance of the transaction manager that is instantiated in the partition, wherein such configuration is stored at a configuration file associated with the partition.

12. The method of claim 8, wherein recovering the in-doubt transactions is performed without using a transaction log.

13. The method of claim 12, wherein recovering the in-doubt transactions comprises:
comparing a list of in-doubt transactions retrieved from each of the resource managers of the partition with a list of in-doubt transactions retrieved from the determiner resource manager; and
rolling back one or more in-doubt transactions which appear in the list of in-doubt transactions retrieved from each of the resource managers of the partition but do not appear in the list of in-doubt transactions retrieved from the determiner resource manager.

14. The method of claim 12, wherein recovering the in-doubt transactions comprises:
comparing a list of in-doubt transactions retrieved from each of the resource managers of the partition with a list of in-doubt transactions retrieved from the determiner resource manager; and
committing one or more in-doubt transactions which appear in the list of in-doubt transactions retrieved from each of the resource managers of the partition and which also appear in the list of in-doubt transactions retrieved from the determiner resource manager.

15. A non-transitory computer readable storage medium having instructions thereon for transaction recovery in a multitenant application server environment, which when read and executed cause a compu7ter to perform steps comprising:
providing, at one or more computers, an application server executing thereon, the application server comprising a domain for execution of software applications, and one or more resources that are deployable to the domain for use by the software applications;
wherein the application server comprises a domain configuration that is used at runtime to define the domain for execution of the software applications, a plurality of partitions, and one or more resource groups,
wherein each partition, of the plurality of partitions, is associated with a partition identifier and a partition configuration, and provides an administrative and runtime subdivision of the domain, wherein each partition comprises one or more software applications, one or more resource groups of the partition and one or more resource group template references;
operating a transaction manager within the application server, wherein a plurality of instances of the transaction manager are instantiated, respectively, in each partition of the plurality of partitions;
executing a transaction in the context of a partition of the plurality of partitions, the transaction utilizing resources of the partition, resource managers of the partition, an instance of the transaction manager that is instantiated in the partition, and a determiner resource manager of a plurality of determiner resource managers provided within the application server, the determiner resource manager being exclusively scoped to the partition;
upon a failure of the transaction executing in the context of the partition based upon an indication from the determiner resource manager that is exclusive scoped to the partition, recovering, by the instance of the transaction manager that is instantiated in the partition, in-doubt transactions associated with the transaction executing in the context of the first partition without affecting transactions executing in the context of any other partition.

16. The non-transitory computer readable storage medium of claim 15,
wherein partition is accessible by a virtual target.

17. The non-transitory computer readable storage medium of claim 15,
wherein a resource manager of the resource managers of the partition is configured as the determiner resource manager by a configuration file associated with the partition.

18. The non-transitory computer readable storage medium of claim 15, the steps further comprising:
configuring a resource manager of the resource managers of the partition as the determiner resource manager by the instance of the transaction manager that is instantiated in the partition, wherein such configuration is stored at a configuration file associated with the partition.

19. The non-transitory computer readable storage medium of claim 15, wherein recovering the in-doubt transactions is performed without using a transaction log.

20. The non-transitory computer readable storage medium of claim 19, wherein recovering the in-doubt transactions comprises:
comparing a list of in-doubt transactions retrieved from each of the resource managers of the partition with a list of in-doubt transactions retrieved from the determiner resource manager; and
rolling back one or more in-doubt transactions which appear in the list of in-doubt transactions retrieved from each of the resource managers of the partition but do not appear in the list of in-doubt transactions retrieved from the determiner resource manager.

* * * * *

UNITED STATES PATENT AND TRADEMARK OFFICE
CERTIFICATE OF CORRECTION

| | |
|---|---|
| PATENT NO. | : 11,994,959 B2 |
| APPLICATION NO. | : 17/519407 |
| DATED | : May 28, 2024 |
| INVENTOR(S) | : Parkinson et al. |

It is certified that error appears in the above-identified patent and that said Letters Patent is hereby corrected as shown below:

In the Specification

In Column 12, Line 5, delete "overhead" and insert -- overhead. --, therefor.

In Column 18, Line 40, delete "log" and insert -- log. --, therefor.

In the Claims

In Column 21, Line 41, in Claim 15, delete "compu7ter" and insert -- computer --, therefor.

Signed and Sealed this
Eighth Day of October, 2024

*Katherine Kelly Vidal*

Katherine Kelly Vidal
*Director of the United States Patent and Trademark Office*